United States Patent
Gordon et al.

(10) Patent No.: US 12,540,273 B2
(45) Date of Patent: Feb. 3, 2026

(54) PROPPANT PARTICLES FORMED FROM FLUID COKE AND FLEXICOKE, FRACTURING FLUIDS COMPRISING SUCH PROPPANT PARTICLES, AND METHODS RELATED THERETO

(71) Applicant: ExxonMobil Technology and Engineering Company, Spring, TX (US)

(72) Inventors: Peter A. Gordon, Yardley, PA (US); P. Matthew Spiecker, Manvel, TX (US)

(73) Assignee: ExxonMobil Technology and Engineering Company, Spring, TX (US)

(*) Notice: Subject to any disclaimer, the term of this patent is extended or adjusted under 35 U.S.C. 154(b) by 0 days.

(21) Appl. No.: 18/675,651

(22) Filed: May 28, 2024

(65) Prior Publication Data

US 2025/0236786 A1 Jul. 24, 2025

Related U.S. Application Data

(63) Continuation-in-part of application No. 18/417,433, filed on Jan. 19, 2024, now abandoned, and a
(Continued)

(51) Int. Cl.
*C09K 8/80* (2006.01)
*C09K 8/66* (2006.01)
*E21B 43/267* (2006.01)

(52) U.S. Cl.
CPC .............. *C09K 8/80* (2013.01); *C09K 8/66* (2013.01); *E21B 43/267* (2013.01)

(58) Field of Classification Search
CPC ........................................................ E21B 43/26
See application file for complete search history.

(56) References Cited

U.S. PATENT DOCUMENTS 1,754,765 A 4/1930 Parr et al.
3,089,542 A 5/1963 Kolodny
(Continued)

FOREIGN PATENT DOCUMENTS

CA 684454 A 4/1964
CA 2863283 A1 3/2015
(Continued)

OTHER PUBLICATIONS

International Search Report and Written Opinion, dated Apr. 27, 2021 issued in related PCT Application No. PCT/US2021/015152, 12 pages.
(Continued)

*Primary Examiner* — William D Hutton, Jr.
*Assistant Examiner* — Avi T Skaist
(74) *Attorney, Agent, or Firm* — Troutman Pepper Locke LLP; John A. Morrissett; Scott A. Bergeson

(57) ABSTRACT

A fracturing fluid comprises a carrier fluid and thermally post-treated fluid coke and/or flexicoke proppant particles, comprising fluid coke and/or flexicoke particles, respectively, that have been thermally post-treated to a temperature in a range from 400° C. to 1200° C. for a predetermined duration. A method of utilizing such fracturing fluid comprises introducing the fracturing fluid into a subterranean formation. A method of making such fracturing fluid comprises producing the thermally post-treated fluid coke and/or flexicoke proppant particles by thermally post-treating the fluid coke and/or flexicoke particles, respectively, to the temperature in the range from 400° C. to 1200° C. for the predetermined duration and mixing the thermally post-treated fluid coke and/or flexicoke proppant particles with the carrier fluid, optionally along with one or more other types of proppant particles and/or one or more additives.

43 Claims, 6 Drawing Sheets

Related U.S. Application Data continuation-in-part of application No. 18/417,492, filed on Jan. 19, 2024, now abandoned, and a continuation-in-part of application No. 18/417,488, filed on Jan. 19, 2024, now abandoned, and a continuation-in-part of application No. 18/417,483, filed on Jan. 19, 2024, now abandoned, and a continuation-in-part of application No. 18/417,478, filed on Jan. 19, 2024, now abandoned.

(56) References Cited

U.S. PATENT DOCUMENTS

| | | | |
|---|---|---|---|
| 3,283,817 | A | 11/1966 | Roberts |
| 3,659,651 | A | 5/1972 | Graham |
| 3,661,543 | A | 5/1972 | Saxton |
| 3,664,420 | A * | 5/1972 | Graham .................. C09K 8/80 166/280.2 |
| 3,700,032 | A * | 10/1972 | Terry .................. E21B 43/26 166/308.1 |
| 3,702,516 | A | 11/1972 | Luckenbach |
| 3,707,462 | A | 12/1972 | Moss |
| 3,759,676 | A | 9/1973 | Lahn |
| 3,816,084 | A | 6/1974 | Moser et al. |
| 4,036,750 | A | 7/1977 | Jaros et al. |
| 4,213,848 | A | 7/1980 | Saxton |
| 4,219,402 | A | 8/1980 | DeGeorge |
| 4,269,696 | A | 5/1981 | Metrailer |
| 4,741,840 | A | 5/1988 | Atherton et al. |
| 4,796,701 | A | 1/1989 | Hudson et al. |
| 4,957,174 | A | 9/1990 | Whitfill et al. |
| 5,189,102 | A | 2/1993 | Tsubuko et al. |
| 5,215,143 | A | 6/1993 | Gentry |
| 5,472,596 | A | 12/1995 | Kerby et al. |
| 5,604,184 | A | 2/1997 | Ellis et al. |
| 5,889,137 | A | 3/1999 | Hutchings et al. |
| 5,899,272 | A | 5/1999 | Loree |
| 6,016,879 | A | 1/2000 | Burts, Jr. |
| 6,035,936 | A | 3/2000 | Whalen |
| 6,059,034 | A | 5/2000 | Rickards et al. |
| 6,283,212 | B1 | 9/2001 | Hinkel et al. |
| 6,330,916 | B1 | 12/2001 | Rickards et al. |
| 6,720,290 | B2 | 4/2004 | England et al. |
| 6,825,152 | B2 | 11/2004 | Green |
| 7,073,581 | B2 | 7/2006 | Nguyen et al. |
| 7,210,528 | B1 | 5/2007 | Brannon et al. |
| 7,237,609 | B2 | 7/2007 | Nguyen |
| 7,249,500 | B2 | 7/2007 | Dutton et al. |
| 7,255,169 | B2 | 8/2007 | van Batenburg et al. |
| 7,270,879 | B2 | 9/2007 | McCrary |
| 7,325,608 | B2 | 2/2008 | van Batenburg et al. |
| 7,334,635 | B2 | 2/2008 | Nguyen |
| 7,337,839 | B2 | 3/2008 | Ayoub et al. |
| 7,424,911 | B2 | 9/2008 | McCarthy et al. |
| 7,450,053 | B2 | 11/2008 | Funk et al. |
| 7,472,751 | B2 | 1/2009 | Brannon et al. |
| 7,494,711 | B2 | 2/2009 | Kaufman et al. |
| 7,521,389 | B2 | 4/2009 | Shmotev et al. |
| 7,527,097 | B2 | 5/2009 | Patel |
| 7,528,096 | B2 | 5/2009 | Brannon et al. |
| 7,541,318 | B2 | 6/2009 | Weaver et al. |
| 7,568,524 | B2 | 8/2009 | Blackburn et al. |
| 7,598,898 | B1 | 10/2009 | Funk et al. |
| 7,612,021 | B2 | 11/2009 | Chatterji et al. |
| 7,648,934 | B2 | 1/2010 | Shmotev et al. |
| 7,669,657 | B2 | 3/2010 | Symington et al. |
| 7,699,106 | B2 | 4/2010 | Brannon et al. |
| 7,703,531 | B2 | 4/2010 | Huang et al. |
| 7,721,803 | B2 | 5/2010 | Huang et al. |
| 7,726,399 | B2 | 6/2010 | Brannon et al. |
| 7,727,940 | B2 | 6/2010 | Reddy et al. |
| 7,735,556 | B2 | 6/2010 | Misselbrook et al. |
| 7,772,163 | B1 | 8/2010 | Brannon et al. |
| 7,789,147 | B2 | 9/2010 | Brannon et al. |
| 7,790,656 | B2 | 9/2010 | Windebank et al. |
| 7,825,053 | B2 | 11/2010 | Duenckel et al. |
| 7,833,947 | B1 | 11/2010 | Kubala |
| 7,841,411 | B2 | 11/2010 | Fuller et al. |
| 7,900,702 | B2 | 3/2011 | Reddy et al. |
| 7,918,277 | B2 | 4/2011 | Brannon et al. |
| 7,954,548 | B2 | 6/2011 | Curimbaba et al. |
| 7,971,644 | B2 | 7/2011 | Ladva et al. |
| 8,003,214 | B2 | 8/2011 | Rediger et al. |
| 8,006,755 | B2 | 8/2011 | Bicerano |
| 8,058,213 | B2 | 11/2011 | Rediger et al. |
| 8,061,427 | B2 | 11/2011 | Jackson et al. |
| 8,063,000 | B2 | 11/2011 | Wilson |
| 8,082,994 | B2 | 12/2011 | Nguyen et al. |
| 8,091,637 | B2 | 1/2012 | Fripp |
| 8,104,537 | B2 | 1/2012 | Kaminsky |
| 8,113,283 | B2 | 2/2012 | Welton et al. |
| 8,127,844 | B2 | 3/2012 | Luharuka et al. |
| 8,127,849 | B2 | 3/2012 | Gupta |
| 8,127,850 | B2 | 3/2012 | Brannon et al. |
| 8,167,043 | B2 | 5/2012 | Willberg et al. |
| 8,178,477 | B2 | 5/2012 | Skala et al. |
| 8,227,026 | B2 | 7/2012 | McDaniel et al. |
| 8,236,737 | B2 | 8/2012 | Fan et al. |
| 8,240,383 | B2 | 8/2012 | Xu et al. |
| 8,281,857 | B2 | 10/2012 | Willberg et al. |
| 8,291,978 | B2 | 10/2012 | Hutchins et al. |
| 8,327,940 | B2 | 12/2012 | Boronin et al. |
| 8,354,939 | B2 | 1/2013 | McDaniel et al. |
| 8,360,149 | B2 | 1/2013 | Hughes et al. |
| 8,361,373 | B1 | 1/2013 | Byron |
| 8,420,578 | B2 | 4/2013 | Usova et al. |
| 8,459,353 | B2 | 6/2013 | Hughes et al. |
| 8,496,057 | B2 | 7/2013 | Ferrero et al. |
| 8,540,024 | B2 | 9/2013 | Kosarev et al. |
| 8,584,755 | B2 | 11/2013 | Willberg et al. |
| 8,596,355 | B2 | 12/2013 | Kaminsky et al. |
| 8,596,361 | B2 | 12/2013 | Willberg et al. |
| 8,596,362 | B2 | 12/2013 | Nelson |
| 8,603,578 | B2 | 12/2013 | Smith et al. |
| 8,607,870 | B2 | 12/2013 | Gu et al. |
| 8,613,314 | B2 | 12/2013 | Garcia-Lopez De Victoria et al. |
| 8,614,157 | B2 | 12/2013 | Pope et al. |
| 8,701,774 | B2 | 4/2014 | Johnson, Sr. |
| 8,739,878 | B2 | 6/2014 | Brannon et al. |
| 8,770,294 | B2 | 7/2014 | Tanguay et al. |
| 8,772,207 | B2 | 7/2014 | Geary et al. |
| 8,869,888 | B2 | 10/2014 | Cramer et al. |
| 8,931,553 | B2 | 1/2015 | Cannan et al. |
| 8,936,083 | B2 | 1/2015 | Nguyen |
| 8,944,164 | B2 | 2/2015 | Veldman et al. |
| 8,959,954 | B2 | 2/2015 | Koseski et al. |
| 8,960,284 | B2 | 2/2015 | Nguyen et al. |
| 8,978,764 | B2 | 3/2015 | Dusseault et al. |
| 8,993,489 | B2 | 3/2015 | McDaniel et al. |
| 9,010,424 | B2 | 4/2015 | Agrawal et al. |
| 9,023,770 | B2 | 5/2015 | Todd et al. |
| 9,080,441 | B2 | 7/2015 | Meurer et al. |
| 9,091,161 | B2 | 7/2015 | Brannon |
| 9,096,790 | B2 | 8/2015 | McCrary et al. |
| 9,097,097 | B2 | 8/2015 | DiFoggio et al. |
| 9,102,867 | B2 | 8/2015 | Parse et al. |
| 9,109,992 | B2 | 8/2015 | Wang |
| 9,140,118 | B2 | 9/2015 | Kulkarni et al. |
| 9,145,513 | B2 | 9/2015 | Pershikova et al. |
| 9,175,210 | B2 | 11/2015 | Eldred et al. |
| 9,175,529 | B2 | 11/2015 | Jamison et al. |
| 9,228,041 | B2 | 1/2016 | Martinez-Castro et al. |
| 9,234,127 | B2 | 1/2016 | De Paiva Cortes et al. |
| 9,234,415 | B2 | 1/2016 | Hughes et al. |
| 9,243,491 | B2 | 1/2016 | McDaniel et al. |
| 9,290,689 | B2 | 3/2016 | Lafitte et al. |
| 9,291,045 | B2 | 3/2016 | Wheeler et al. |
| 9,315,719 | B2 | 4/2016 | Fang et al. |
| 9,322,269 | B2 | 4/2016 | Matherly et al. |
| 9,353,613 | B2 | 5/2016 | Soliman et al. |
| 9,388,334 | B2 | 7/2016 | Hughes et al. |
| 9,458,710 | B2 | 10/2016 | Makarychev-Mikhailov et al. |
| 9,523,268 | B2 | 12/2016 | Potapenko et al. |
| 9,556,376 | B2 | 1/2017 | Huang et al. |

(56) References Cited

U.S. PATENT DOCUMENTS

| | | |
|---|---|---|
| 9,574,130 B2 | 2/2017 | Gupta |
| 9,611,423 B2 | 4/2017 | Zhang et al. |
| 9,631,137 B2 | 4/2017 | Fuss et al. |
| 9,638,016 B2 | 5/2017 | Horvath Szabo et al. |
| 9,643,774 B2 | 5/2017 | Oren |
| 9,650,881 B2 | 5/2017 | Clem |
| 9,657,219 B2 | 5/2017 | Rodriguez |
| 9,670,400 B2 | 6/2017 | Eldred et al. |
| 9,670,762 B2 | 6/2017 | Nguyen et al. |
| 9,670,763 B2 | 6/2017 | Fang et al. |
| 9,670,764 B2 | 6/2017 | Lesko et al. |
| 9,688,905 B2 | 6/2017 | Nguyen et al. |
| 9,701,589 B2 | 7/2017 | Schofalvi |
| 9,715,026 B2 | 7/2017 | Ejofodomi et al. |
| 9,719,011 B2 | 8/2017 | Tanguay et al. |
| 9,732,269 B2 | 8/2017 | Bicerano |
| 9,732,561 B2 | 8/2017 | Carter, Jr. |
| 9,739,122 B2 | 8/2017 | Symington et al. |
| 9,745,841 B2 | 8/2017 | Marino et al. |
| 9,783,727 B2 | 10/2017 | Lahman et al. |
| 9,790,422 B2 | 10/2017 | McDaniel |
| 9,803,135 B2 | 10/2017 | Barron et al. |
| 9,816,364 B2 | 11/2017 | Kruspe et al. |
| 9,845,427 B2 | 12/2017 | Soane et al. |
| 9,845,428 B2 | 12/2017 | Soane et al. |
| 9,850,748 B2 | 12/2017 | Nguyen et al. |
| 9,862,879 B2 | 1/2018 | Chatterjee et al. |
| 9,879,175 B2 | 1/2018 | Aines et al. |
| 9,896,618 B2 | 2/2018 | Huang et al. |
| 9,896,619 B2 | 2/2018 | Nguyen et al. |
| 9,902,899 B2 | 2/2018 | Parse et al. |
| 9,914,872 B2 | 3/2018 | Wehunt et al. |
| 9,920,607 B2 | 3/2018 | Brannon et al. |
| 9,920,610 B2 | 3/2018 | Nelson et al. |
| 9,932,521 B2 | 4/2018 | Soane et al. |
| 9,938,454 B2 | 4/2018 | Tanguay et al. |
| 9,938,811 B2 | 4/2018 | Bestaoui-Spurr et al. |
| 9,944,845 B2 | 4/2018 | Tanguay et al. |
| 9,957,440 B2 | 5/2018 | Nguyen et al. |
| 9,995,125 B2 | 6/2018 | Madasu et al. |
| 10,001,003 B2 | 6/2018 | Dusseault et al. |
| 10,001,769 B2 | 6/2018 | Huang et al. |
| 10,011,763 B2 | 7/2018 | Hartman et al. |
| 10,017,688 B1 | 7/2018 | Green et al. |
| 10,023,791 B1 | 7/2018 | Corcoran et al. |
| 10,060,244 B2 | 8/2018 | Nguyen et al. |
| 10,081,758 B2 | 9/2018 | Dreyer et al. |
| 10,082,013 B2 | 9/2018 | Nguyen et al. |
| 10,087,735 B2 | 10/2018 | Brannon |
| 10,093,849 B2 | 10/2018 | Windebank et al. |
| 10,106,728 B2 | 10/2018 | Dusterhoft et al. |
| 10,106,732 B2 | 10/2018 | Cannan et al. |
| 10,113,106 B2 | 10/2018 | Wadekar |
| 10,113,406 B1 | 10/2018 | Gomaa et al. |
| 10,138,415 B2 | 11/2018 | Bryant et al. |
| 10,150,907 B2 | 12/2018 | Weaver et al. |
| 10,202,836 B2 | 2/2019 | Veldman et al. |
| 10,208,243 B2 | 2/2019 | Burks et al. |
| 10,214,682 B2 | 2/2019 | Nguyen et al. |
| 10,221,660 B2 | 3/2019 | Moeller et al. |
| 10,227,525 B2 | 3/2019 | Monroe et al. |
| 10,233,386 B2 | 3/2019 | Chatterjee et al. |
| 10,240,447 B2 | 3/2019 | Gupta et al. |
| 10,253,250 B2 | 4/2019 | Nguyen et al. |
| 10,266,758 B2 | 4/2019 | Rediger |
| 10,267,133 B2 | 4/2019 | Gullickson et al. |
| 10,267,134 B2 | 4/2019 | Cannan et al. |
| 10,280,363 B2 | 5/2019 | Suzart et al. |
| 10,287,482 B2 | 5/2019 | Ferm et al. |
| 10,287,867 B2 | 5/2019 | Nguyen et al. |
| 10,301,920 B2 | 5/2019 | Green et al. |
| 10,352,145 B2 | 7/2019 | Maxwell et al. |
| 10,364,660 B2 | 7/2019 | Nguyen et al. |
| 10,369,724 B2 | 8/2019 | Ortega Andrade et al. |
| 10,370,586 B2 | 8/2019 | Fitzgerald et al. |
| 10,370,950 B2 | 8/2019 | Gupta et al. |
| 10,400,054 B2 | 9/2019 | Viswanath et al. |
| 10,421,897 B2 | 9/2019 | Skiba et al. |
| 10,428,266 B2 | 10/2019 | Nguyen et al. |
| 10,428,267 B2 | 10/2019 | Cannan et al. |
| 10,457,855 B2 | 10/2019 | Mahmoud et al. |
| 10,457,859 B2 | 10/2019 | Robl et al. |
| 10,458,220 B2 | 10/2019 | Switzer et al. |
| 10,479,704 B2 | 11/2019 | Hayes et al. |
| 10,479,929 B2 | 11/2019 | Gupta |
| 10,519,361 B2 | 12/2019 | Wadekar et al. |
| 10,519,364 B2 | 12/2019 | Stephens et al. |
| 10,538,696 B2 | 1/2020 | Allen et al. |
| 10,538,697 B2 | 1/2020 | Nguyen et al. |
| 10,557,335 B2 | 2/2020 | Potapenko et al. |
| 10,590,265 B2 | 3/2020 | Yalcin et al. |
| 10,590,324 B2 | 3/2020 | Kulkarni et al. |
| 10,590,763 B2 | 3/2020 | Sen et al. |
| 10,611,954 B2 | 4/2020 | Ramos et al. |
| 10,640,388 B2 | 5/2020 | Akbar et al. |
| 10,640,701 B2 | 5/2020 | Montalvo et al. |
| 10,647,907 B2 | 5/2020 | Nguyen et al. |
| 10,647,908 B2 | 5/2020 | Favero |
| 10,647,910 B1 | 5/2020 | Nguyen et al. |
| 10,655,408 B2 | 5/2020 | Goloshchapova |
| 10,655,443 B2 | 5/2020 | Gomaa et al. |
| 10,655,444 B2 | 5/2020 | Nguyen et al. |
| 10,655,466 B2 | 5/2020 | Kabannik |
| 10,661,981 B2 | 5/2020 | Oren et al. |
| 10,689,972 B1 | 6/2020 | Zhao et al. |
| 10,711,564 B2 | 7/2020 | Dusterhoft et al. |
| 10,723,938 B2 | 7/2020 | Johnson, Sr. |
| 10,738,581 B2 | 8/2020 | Nguyen et al. |
| 10,738,582 B2 | 8/2020 | Nguyen et al. |
| 10,738,584 B2 | 8/2020 | Nguyen et al. |
| 10,745,611 B2 | 8/2020 | Nguyen et al. |
| 10,752,828 B2 | 8/2020 | Gomaa et al. |
| 10,767,101 B2 | 9/2020 | Kovalchuk et al. |
| 10,767,104 B2 | 9/2020 | Do et al. |
| 10,793,768 B2 | 10/2020 | Patel et al. |
| 10,801,307 B2 | 10/2020 | Roussel et al. |
| 10,808,167 B2 | 10/2020 | Beuterbaugh et al. |
| 10,808,168 B2 | 10/2020 | Montenegro Galindo et al. |
| 10,808,497 B2 | 10/2020 | Potapenko et al. |
| 10,808,515 B1 | 10/2020 | Sierra et al. |
| 10,815,420 B2 | 10/2020 | Shroff Rama et al. |
| 10,823,646 B1 | 11/2020 | Guo et al. |
| 10,844,280 B2 | 11/2020 | Goyal et al. |
| 10,851,283 B2 | 12/2020 | Potapenko et al. |
| 10,870,792 B2 | 12/2020 | López Reyes et al. |
| 10,876,044 B2 | 12/2020 | Salla et al. |
| 10,882,751 B2 | 1/2021 | Shahsavari et al. |
| 10,900,339 B2 | 1/2021 | Schipper et al. |
| 10,914,139 B2 | 2/2021 | Shahri et al. |
| 10,920,130 B2 | 2/2021 | Nguyen et al. |
| 10,920,558 B2 | 2/2021 | Nguyen et al. |
| 10,934,476 B1 | 3/2021 | Kamavaram et al. |
| 10,941,336 B2 | 3/2021 | Pantsurkin et al. |
| 10,947,447 B2 | 3/2021 | Hendrickson et al. |
| 10,954,430 B2 | 3/2021 | Plishka et al. |
| 10,954,431 B2 | 3/2021 | Chittattukara et al. |
| 10,954,768 B2 | 3/2021 | Gullickson et al. |
| 10,961,444 B1 | 3/2021 | Bestaoui-Spurr et al. |
| 10,975,295 B2 | 4/2021 | Cannan et al. |
| 10,984,156 B2 | 4/2021 | Wu et al. |
| 10,988,674 B2 | 4/2021 | Nguyen et al. |
| 10,988,679 B2 | 4/2021 | Calvin |
| 10,989,034 B2 | 4/2021 | Lin et al. |
| 11,008,506 B2 | 5/2021 | Nguyen et al. |
| 11,008,845 B2 | 5/2021 | Singh et al. |
| 11,014,810 B1 | 5/2021 | De Wit et al. |
| 11,015,437 B2 | 5/2021 | Zhang et al. |
| 11,021,649 B2 | 6/2021 | Bai et al. |
| 11,028,318 B2 | 6/2021 | Cannan et al. |
| 11,078,409 B2 | 8/2021 | Allison |
| 11,104,841 B2 | 8/2021 | Hill et al. |
| 11,111,766 B2 | 9/2021 | Brannon et al. |
| 11,124,696 B2 | 9/2021 | Khamatnurova et al. |
| 11,125,068 B2 | 9/2021 | Jiang et al. |

(56) References Cited

U.S. PATENT DOCUMENTS

| | | |
|---|---|---|
| 11,142,680 B2 | 10/2021 | Dreyer et al. |
| 11,155,751 B2 | 10/2021 | Bestaoui-Spurr et al. |
| 11,162,022 B2 | 11/2021 | Cannan et al. |
| 11,162,347 B2 | 11/2021 | Yu et al. |
| 11,180,691 B2 | 11/2021 | Sodhi et al. |
| 11,230,660 B2 | 1/2022 | Nguyen et al. |
| 11,236,599 B2 | 2/2022 | Nguyen et al. |
| 11,254,857 B2 | 2/2022 | Cox et al. |
| 11,255,176 B2 | 2/2022 | Nguyen et al. |
| 11,274,243 B2 | 3/2022 | Siddiqui et al. |
| 11,280,172 B2 | 3/2022 | Peng et al. |
| 11,313,211 B2 | 4/2022 | Johnson |
| 11,313,214 B2 | 4/2022 | Nguyen et al. |
| 11,319,482 B2 | 5/2022 | Rahy et al. |
| 11,326,088 B2 | 5/2022 | Todd |
| 11,339,323 B2 | 5/2022 | Roper et al. |
| 11,345,848 B2 | 5/2022 | Khamatnurova et al. |
| 11,352,551 B2 | 6/2022 | Agrawal et al. |
| 11,365,341 B2 | 6/2022 | Patil et al. |
| 11,377,581 B2 | 7/2022 | Belakshe et al. |
| 11,377,944 B2 | 7/2022 | Santra et al. |
| 11,396,800 B2 | 7/2022 | Madasu et al. |
| 11,407,932 B2 | 8/2022 | Deysarkar et al. |
| 11,408,281 B2 | 8/2022 | Lu et al. |
| 11,414,974 B2 | 8/2022 | Entchev et al. |
| 11,427,753 B2 | 8/2022 | Ortega Andrade et al. |
| 11,428,087 B2 | 8/2022 | Nguyen et al. |
| 11,428,839 B2 | 8/2022 | Mukherjee |
| 11,434,740 B1 | 9/2022 | Nguyen et al. |
| 11,441,406 B2 | 9/2022 | Nguyen et al. |
| 11,447,690 B2 | 9/2022 | Nguyen et al. |
| 11,447,693 B2 | 9/2022 | Jenkins et al. |
| 11,459,500 B2 | 10/2022 | Khamatnurova et al. |
| 11,465,155 B1 | 10/2022 | Mitchell et al. |
| 11,466,201 B2 | 10/2022 | Smith, Jr. et al. |
| 11,485,901 B2 | 11/2022 | Shen et al. |
| 11,486,241 B2 | 11/2022 | Nelson et al. |
| 11,492,543 B2 | 11/2022 | Gordon et al. |
| 11,506,584 B2 | 11/2022 | Martysevich et al. |
| 11,512,025 B2 | 11/2022 | Eldred et al. |
| 11,535,588 B2 | 12/2022 | Favero et al. |
| 11,536,125 B1 | 12/2022 | Yang et al. |
| 11,560,776 B2 | 1/2023 | Madasu |
| 11,566,488 B2 | 1/2023 | Brandl et al. |
| 11,566,504 B2 | 1/2023 | Perez et al. |
| 11,568,111 B2 | 1/2023 | Zhou et al. |
| 11,578,262 B2 | 2/2023 | Gordon et al. |
| 11,590,469 B2 | 2/2023 | Cho et al. |
| 11,591,903 B2 | 2/2023 | Mukherjee |
| 11,597,872 B2 | 3/2023 | Conkle |
| 11,608,724 B2 | 3/2023 | Chopade et al. |
| 11,608,740 B2 | 3/2023 | Moos et al. |
| 11,613,691 B1 | 3/2023 | Pollock |
| 11,613,989 B2 | 3/2023 | Zhang et al. |
| 11,629,284 B1 | 4/2023 | Saini et al. |
| 11,629,581 B2 | 4/2023 | Cook |
| 11,643,592 B1 | 5/2023 | Saini et al. |
| 11,649,398 B1 | 5/2023 | AlTammar et al. |
| 11,656,002 B2 | 5/2023 | Nevison et al. |
| 11,661,842 B2 | 5/2023 | Dalamarinis et al. |
| 11,667,831 B2 | 6/2023 | Liang et al. |
| 11,667,832 B2 | 6/2023 | Saini et al. |
| 11,674,074 B2 | 6/2023 | Sherman |
| 11,692,127 B2 | 7/2023 | Dawson et al. |
| 11,692,424 B2 | 7/2023 | Nguyen et al. |
| 11,697,759 B1 | 7/2023 | Dusterhoft et al. |
| 11,697,760 B2 | 7/2023 | Stover et al. |
| 11,702,587 B2 | 7/2023 | Li et al. |
| 11,702,588 B1 | 7/2023 | Saini et al. |
| 11,713,414 B1 | 8/2023 | Dobson et al. |
| 11,732,179 B2 | 8/2023 | Vidma et al. |
| 11,753,584 B2 | 9/2023 | Mazrooee et al. |
| 11,753,919 B2 | 9/2023 | Velikanov et al. |
| 11,753,923 B2 | 9/2023 | Dalamarinis |
| 11,767,466 B2 | 9/2023 | Santra et al. |
| 11,781,062 B1 | 10/2023 | Liu et al. |
| 11,781,412 B2 | 10/2023 | Zhang et al. |
| 11,814,923 B2 | 11/2023 | Sherman et al. |
| 11,827,845 B2 | 11/2023 | Vigderman et al. |
| 11,840,911 B2 | 12/2023 | Fan et al. |
| 11,845,895 B2 | 12/2023 | Montalvo et al. |
| 11,859,129 B2 | 1/2024 | Uddenburg et al. |
| 11,859,489 B2 | 1/2024 | Werry et al. |
| 11,876,398 B1 | 1/2024 | Heath et al. |
| 11,965,677 B2 | 4/2024 | Cook et al. |
| 12,037,894 B2 | 7/2024 | Zhang et al. |
| 2001/0001308 A1 | 5/2001 | Varadaraj et al. |
| 2004/0014824 A1 | 1/2004 | Leinweber et al. |
| 2004/0040708 A1 | 3/2004 | Stephenson et al. |
| 2005/0244641 A1 | 11/2005 | Vincent |
| 2005/0274523 A1 | 12/2005 | Brannon et al. |
| 2006/0073980 A1 | 4/2006 | Brannon et al. |
| 2006/0175059 A1 | 8/2006 | Sinclair et al. |
| 2006/0272816 A1 | 12/2006 | Willberg et al. |
| 2008/0135246 A1 | 6/2008 | Canova et al. |
| 2008/0156489 A1 | 7/2008 | Pershikova et al. |
| 2009/0038797 A1 | 2/2009 | Skala et al. |
| 2009/0038799 A1 | 2/2009 | Garcia-Lopez de Victoria et al. |
| 2009/0075847 A1 | 3/2009 | Wawrzos et al. |
| 2009/0283447 A1 | 11/2009 | D'Elia et al. |
| 2010/0179077 A1 | 7/2010 | Turakhia et al. |
| 2010/0263865 A1 | 10/2010 | Willberg et al. |
| 2011/0082033 A1 | 4/2011 | Frohs et al. |
| 2011/0111990 A1 | 5/2011 | Pershikova et al. |
| 2011/0118155 A1 | 5/2011 | Pisklak et al. |
| 2012/0043080 A1 | 2/2012 | Edwards |
| 2012/0088699 A1 | 4/2012 | Qin |
| 2012/0241168 A1 | 9/2012 | Pei et al. |
| 2012/0267102 A1 | 10/2012 | Huang et al. |
| 2013/0025867 A1 | 1/2013 | Sun et al. |
| 2014/0014338 A1 | 1/2014 | Crews et al. |
| 2014/0096952 A1 | 4/2014 | Hocking |
| 2014/0196898 A1 | 7/2014 | Tanguay et al. |
| 2014/0209390 A1 | 7/2014 | Jamison et al. |
| 2014/0353042 A1 | 12/2014 | Karale et al. |
| 2015/0167437 A1 | 6/2015 | Dawson |
| 2015/0211346 A1 | 7/2015 | Potapenko et al. |
| 2015/0233226 A1 | 8/2015 | Holzhauser et al. |
| 2015/0247084 A1 | 9/2015 | Epstein |
| 2015/0292279 A1 | 10/2015 | Wang |
| 2015/0361331 A1 | 12/2015 | Tanguay et al. |
| 2016/0137910 A1 | 5/2016 | Chang et al. |
| 2016/0215205 A1 | 7/2016 | Nguyen et al. |
| 2016/0312126 A1 | 10/2016 | Wormsbecker et al. |
| 2016/0319185 A1 | 11/2016 | Semenov et al. |
| 2016/0326300 A1 | 11/2016 | Gelves et al. |
| 2016/0340573 A1 | 11/2016 | Semenov et al. |
| 2017/0145302 A1 | 5/2017 | Qin et al. |
| 2017/0198209 A1 | 7/2017 | Stephenson et al. |
| 2017/0321105 A1 | 11/2017 | McDaniel et al. |
| 2018/0066179 A1 | 3/2018 | Nguyen et al. |
| 2018/0282222 A1 | 10/2018 | Khan |
| 2018/0339946 A1 | 11/2018 | Öttinger et al. |
| 2019/0016944 A1 | 1/2019 | Eldred et al. |
| 2019/0048146 A1 | 2/2019 | Dei Santi et al. |
| 2019/0112520 A1 | 4/2019 | Knoer et al. |
| 2019/0194549 A1 | 6/2019 | Dubois et al. |
| 2019/0241789 A1 | 8/2019 | Agapiou et al. |
| 2019/0330520 A1 | 10/2019 | Cannan et al. |
| 2020/0131431 A1 | 4/2020 | Russum |
| 2020/0157415 A1 | 5/2020 | Quintero et al. |
| 2020/0208047 A1 | 7/2020 | Gordon et al. |
| 2020/0306710 A1 | 10/2020 | Cho et al. |
| 2020/0370405 A1 | 11/2020 | Nguyen et al. |
| 2021/0002994 A1 | 1/2021 | Zhou et al. |
| 2021/0087459 A1 | 3/2021 | Patil et al. |
| 2021/0131261 A1 | 5/2021 | Wang et al. |
| 2021/0207465 A1 | 7/2021 | Nguyen et al. |
| 2021/0229049 A1 | 7/2021 | Mazrooee et al. |
| 2021/0246364 A1* | 8/2021 | Gordon ............... E21B 43/267 |
| 2021/0253943 A1 | 8/2021 | Ghosh et al. |
| 2021/0253944 A1 | 8/2021 | Gordon et al. |
| 2021/0317733 A1 | 10/2021 | Downey |
| 2021/0340432 A1 | 11/2021 | Bhaduri et al. |

(56) References Cited

U.S. PATENT DOCUMENTS

| | | |
|---|---|---|
| 2022/0090475 A1 | 3/2022 | Radwan |
| 2022/0112422 A1 | 4/2022 | Liang et al. |
| 2022/0169915 A1 | 6/2022 | Barron et al. |
| 2022/0186605 A1 | 6/2022 | Quan et al. |
| 2022/0340809 A1 | 10/2022 | Li et al. |
| 2022/0349801 A1 | 11/2022 | Al-Boghail et al. |
| 2023/0085175 A1 | 3/2023 | Smalls et al. |
| 2023/0119075 A1 | 4/2023 | Hall et al. |
| 2023/0123954 A1 | 4/2023 | Maity et al. |
| 2023/0132325 A1 | 4/2023 | Gordon et al. |
| 2023/0134440 A1 | 5/2023 | Decker et al. |
| 2023/0147476 A1 | 5/2023 | Wheelock et al. |
| 2023/0167354 A1 | 6/2023 | Stojkovic et al. |
| 2023/0174848 A1 | 6/2023 | Uddenburg et al. |
| 2023/0175377 A1 | 6/2023 | Nedwed et al. |
| 2023/0183561 A1 | 6/2023 | Carroll et al. |
| 2023/0203362 A1 | 6/2023 | Calvin |
| 2023/0229830 A1 | 7/2023 | Zhao et al. |
| 2023/0257646 A1 | 8/2023 | Robl et al. |
| 2023/0279285 A1 | 9/2023 | Shirley |
| 2023/0279286 A1 | 9/2023 | Gordon et al. |
| 2023/0303911 A1 | 9/2023 | Radwan |
| 2023/0334199 A1 | 10/2023 | Lu et al. |
| 2024/0110471 A1 | 4/2024 | Zhang et al. |
| 2024/0228866 A1 | 7/2024 | Shirley et al. |
| 2024/0228867 A1 | 7/2024 | Stojkovic et al. |
| 2025/0236785 A1 | 7/2025 | Shirley et al. |
| 2025/0236787 A1 | 7/2025 | Benish et al. |
| 2025/0237126 A1 | 7/2025 | Jin et al. |
| 2025/0237127 A1 | 7/2025 | Lee et al. |
| 2025/0237128 A1 | 7/2025 | Shirley et al. |
| 2025/0237129 A1 | 7/2025 | Shirley et al. |
| 2025/0237130 A1 | 7/2025 | Becerril et al. |
| 2025/0263599 A1 | 8/2025 | Gordon et al. |

FOREIGN PATENT DOCUMENTS

| | | |
|---|---|---|
| CN | 203319922 U | 12/2013 |
| CN | 109236262 A | 8/2020 |
| CN | 109751029 B | 10/2021 |
| PL | 234113 B1 | 3/2018 |
| PL | 234114 B1 | 11/2018 |
| WO | 2007141519 A2 | 12/2007 |
| WO | 2008033225 A2 | 3/2008 |
| WO | 2011163529 A1 | 12/2011 |
| WO | 2012040025 A2 | 3/2012 |
| WO | 2012051026 A2 | 4/2012 |
| WO | 2012104582 A1 | 8/2012 |
| WO | 2013059793 A2 | 4/2013 |
| WO | 2013119507 A1 | 8/2013 |
| WO | 2013158308 A1 | 10/2013 |
| WO | 2013176977 A1 | 11/2013 |
| WO | 2014039968 A1 | 3/2014 |
| WO | 2014172953 A1 | 10/2014 |
| WO | 2014172955 A1 | 10/2014 |
| WO | 2015021523 A1 | 2/2015 |
| WO | 2015031415 A2 | 3/2015 |
| WO | 2015041690 A1 | 3/2015 |
| WO | 2016033533 A1 | 3/2016 |
| WO | 2016054022 A1 | 4/2016 |
| WO | 2016074075 A1 | 5/2016 |
| WO | 2016168719 A1 | 10/2016 |
| WO | 2018001748 A1 | 1/2018 |
| WO | 2018094123 A1 | 5/2018 |
| WO | 2019164694 A1 | 8/2019 |
| WO | 2019199431 A1 | 10/2019 |
| WO | 2019/222034 A1 | 11/2019 |
| WO | 2020131122 A1 | 6/2020 |
| WO | 2020139472 A1 | 7/2020 |
| WO | 2020185373 A1 | 9/2020 |
| WO | 2021030287 A1 | 2/2021 |
| WO | 2022232715 A1 | 11/2022 |
| WO | 2022241338 A1 | 11/2022 |
| WO | 2022241339 A1 | 11/2022 |
| WO | 2023040535 A1 | 3/2023 |
| WO | 2024/102224 A1 | 5/2024 |
| WO | 2024131192 A1 | 6/2024 |
| WO | 2025/155374 A1 | 7/2025 |

OTHER PUBLICATIONS

International Search Report and Written Opinion, dated Apr. 27, 2021 issued in related PCT Application No. PCT/US2021/015153, 11 pages.

International Search Report and Written Opinion, dated Jun. 18, 2023 issued in related PCT Application No. PCT/US2023/063275, 9 pages.

A. Abrams, "Mud Design To Minimize Rock Impairment Due To Particle Invasion", J Pet Technol 29 (05): 586-592, May 1, 1977.

Alvarez et al., "Wettability Alteration and Spontaneous Imbibition in Unconventional Liquid Reservoirs by Surfactant Additives", SPE Res 4:21): 107-117, Jun. 28, 2016.

Alzanam et al., "A Multiwalled Carbon Nanotube-Based Polyurethane Nanocomposite-Coated Sand/Proppant for Improved Mechanical Strength and Flowback Control in Hydraulic Fracturing Applications", ACS Omega, vol. 6, Issue 32, Aug. 5, 2021.

Arshadi et al., "Proppant-packed fractures in shale gas reservoirs: An in-situ investigation of deformation, wettability, and multiphase flow effects", Journal of Natural Gas Science and Engineering, vol. 59, Nov. 2018.

Arshadi et al., "The effect of deformation on two-phase flow through proppant-packed fractured shale samples: A micro-scale experimental investigation", Advances in Water Resources, vol. 105, Jul. 2017.

Calvin et al., "Enhancement of Well Production in the SCOOP Woodford Shale through the Application of Microproppant", Paper presented at the SPE Hydraulic Fracturing Technology Conference and Exhibition, The Woodlands, Texas, USA, Jan. 24, 2017.

Dahl et al., "Application of Micro-Proppant to Enhance Well Production in Unconventional Reservoirs: Laboratory and Field Results", Paper presented at the SPE Western Regional Meeting, Garden Grove, California, USA, Apr. 27, 2015.

Dong et al., "Effect of surface wettability of ceramic proppant on oil flow performance in hydraulic fractures", Energy Science & Engineering, vol. 7, issue 2, Feb. 19, 2019.

Edward Furimsky, "Characterization of cokes from fluid/flexicoking of heavy feeds", Fuel Processing Technology, vol. 67, No. 3, 205-230, XP055559715, Sep. 1, 2000, 5 pages.

Elkhatib et al., "Pore-Scale Study of Wettability Alteration and Fluid Flow in Propped Fractures of Ultra-Tight Carbonates", Langmuiir, Colume 39 Issue 5, Jan. 24, 2023.

Go et al., "Evaluation of Coated Proppant Unconventional Performance", Energy & Fuels, vol. 35, Issue 11, May 17, 2021.

Huang et al., "Effects of Proppant Wettability and Size on Transport and Retention of Coal Fines in Saturated Proppant Packs: Experimental and Theoretical Studies", Energy Fuels 2021, 35, 15, 11976-11991, Jul. 7, 2021.

International Search Report and the Written Opinion of the International Searching Authority, mailed Jun. 13, 2022, International Application No. PCT/US2022/070811, 10 pages.

International Search Report and the Written Opinion of the International Searching Authority, mailed Jun. 13, 2022, International Application No. PCT/US2022/070776, 10 pages.

International Search Report and the Written Opinion of the International Searching Authority, mailed May 19, 2023, International Application No. PCT/US2023/062816, 10 pages.

Jackson et al., "Stimulation Design and Treatment in the Sycamore Formation of the South Central Oklahoma Oil Province Area of the Anadarko Basin", Paper presented at the SPE Hydraulic Fracturing Technology Conference and Exhibition, The Woodlands, Texas, USA, Jan. 23, 2018.

Kumar et al., "The Role of Micro-Proppants in Conductive Fracture Network Development", Paper presented at the SPE Hydraulic Fracturing Technology Conference and Exhibition, The Woodlands, Texas, USA, Jan. 29, 2019.

(56) References Cited

OTHER PUBLICATIONS

Labus K. et al., "IOP Conference Series: Earth and Environmental Science Paper @Bullet Open Access The concept of coke based proppants for coal bed fracturing", XP055798892, Dec. 31, 2019, 12 pages.

Lau et al., "Maximizing Production from Shale Reservoir by Using Micro-Sized Proppants", Paper presented at the International Petroleum Technology Conference, Beijing, China, Mar. 22, 2019.

Le et al., "Methane foam performance in oil-wet unconsolidated porous media: A systematic experimental investigation at reservoir conditions", Fuel, vol. 344, Jul. 15, 2023.

Liao et al., "Lightweight proppants in unconventional oil and natural gas development: A review", Sustainable Materials and Technologies, vol. 33, Sep. 2022.

Mishra Debesh Devadutta, "Thermal Analysis of Polyethylene Terephthalate (PET)—Coke Composites Prepared by Mechanical Alloying Technique", XP055926292, DOI: 10.20944/preprints201608.0099.vl, Aug. 2, 2016, 21 pages.

Montgomery et al., "Utilizing Discrete Fracture Modeling and Microproppant to Predict and Sustain Production Improvements in Nano Darcy Rock", Paper presented at the SPE Hydraulic Fracturing Technology Conference and Exhibition, The Woodlands, Texas, USA, Jan. 28, 2020.

Ngata et al., "Review of Developments in Nanotechnology Application for Formation Damage Control", Energy & Fuels, vol. 36, Issue 1, Dec. 27, 2021.

Palisch et al., "Initial Observations From a Bakken Microproppant Field Trial", Paper presented at the SPE Hydraulic Fracturing Technology Conference and Exhibition, The Woodlands, Texas, USA, Jan. 24, 2023.

Radwan et al., "An Engineered Microparticles-Based Slurry Pumped in Over 10,000 Stages Provided Notable Operational and Production Improvements in Challenging Formations", Paper presented at the SPE Annual Technical Conference and Exhibition, Houston, Texas, USA, Sep. 26, 2022.

Tabatabaei et al., "Surface Modification of Proppant Using Hydrophobic Coating To Enhance Long-Term Production", SPE Production & Operations, vol. 36, Issue 1, Feb. 10, 2021.

Wang et al., "Effect of Fluid Contact Angle of Oil-Wet Fracture Proppant on the Competing Water/Oil Flow in Sandstone-Proppant Systems", Sustainability, Mar. 23, 2022.

Wang et al., "Experimental and numerical investigations of water-oil two-phase flow in fractures with proppants of different wetting properties", Journal of Petroleum Science and Engineering, vol. 214, Jul. 2022.

White Paper, "Significant Uplift Achieved with Production Enhancement Product", The Future of Well Enhancement, Deeprop Microproppant, 8 pages.

Wu et al., "An Experimental Investigation of the Conductivity of Unpropped Fractures in Shales", Paper presented at the SPE Hydraulic Fracturing Technology Conference and Exhibition, The Woodlands, Texas, USA, Jan. 24, 2017.

Xiao et al., "Effect of surface wetting behavior of ceramic proppant on the two-phase flow across the interface of sandstone and fracture", Energy Science & Engineering, vol. 8 issue 4, Dec. 19, 2019.

Chang, F.F., Berger, P.D., Lee C.H., "In-Situ Formation of Proppant and Highly Permeable Blocks for Hydraulic Fracturing", SPE-173328-MS, presented at SPE Hydraulic Fracturing Technology Conference, Woodlands, TX Feb. 3-5, 2015. ABSTRACT.

International Search Report and the Written Opinion of the International Searching Authority, mailed Feb. 28, 2025, International Application No. PCT/US2024/056651, 9 pages.

International Search Report and the Written Opinion of the International Searching Authority, mailed Feb. 17, 2025, International Application No. PCT/US2024/056647, 12 pages.

International Search Report and the Written Opinion of the International Searching Authority, mailed Feb. 17, 2025, International Application No. PCT/US2024/056648, 15 pages.

International Search Report and the Written Opinion of the International Searching Authority, mailed Feb. 17, 2025, International Application No. PCT/US2024/056649, 13 pages.

International Search Report and the Written Opinion of the International Searching Authority, mailed Feb. 24, 2025, International Application No. PCT/US2024/056652, 12 pages.

International Search Report and the Written Opinion of the International Searching Authority, mailed Jun. 10, 2025, International Application No. PCT/US2025/019906, 13 pages.

International Search Report and the Written Opinion of the International Searching Authority, mailed Jun. 10, 2025, International Application No. PCT/US2025/019904, 12 pages.

International Search Report and the Written Opinion of the International Searching Authority, mailed Aug. 18, 2025, International Application No. PCT/US2025/029606, 11 pages.

International Search Report and the Written Opinion of the International Searching Authority, mailed Aug. 25, 2025, International Application No. PCT/US2025/029589, 9 pages.

International Search Report and the Written Opinion of the International Searching Authority, mailed Oct. 2, 2025, International Application No. PCT/US2025/056652, 14 pages.

Harris L. S., "Fume Scrubbing With the Ejector Venturi System", Chemical Engineering Progress, vol. 62, No. 4, Apr. 30, 1966, XP002106911, ISSN: 0360-7275.

\* cited by examiner

PROPPANT PARTICLES FORMED FROM FLUID COKE AND FLEXICOKE, FRACTURING FLUIDS COMPRISING SUCH PROPPANT PARTICLES, AND METHODS RELATED THERETO

CROSS-REFERENCE TO RELATED APPLICATION

This application claims priority to and the benefit of co-pending and commonly-assigned U.S. patent application Ser. No. 18/417,433, filed Jan. 19, 2024, titled "HYDRAULIC FRACTURING FLUID COMPRISING MICRO-PROPPANT COKE PARTICLES, METHOD FOR MAKING SAME, AND HYDRAULIC FRACTURING PROCESSES USING SAME," co-pending and commonly-assigned U.S. patent application Ser. No. 18/417,478, filed Jan. 19, 2024, titled "METHODS FOR PERFORMING REFRACTURING OPERATIONS USING COKE PROPPANT PARTICLES," co-pending and commonly-assigned U.S. patent application Ser. No. 18/417,492, filed Jan. 19, 2024, titled "PROPPANT PARTICLES FORMED FROM FLUID COKE AND FLEXICOKE, FRACTURING FLUIDS COMPRISING SUCH PROPPANT PARTICLES, AND METHODS RELATED THERETO," co-pending and commonly-assigned U.S. patent application Ser. No. 18/417,488, filed Jan. 19, 2024, titled "HYDRAULIC FRACTURING METHODS UTILIZING COKE PROPPANT PARTICLES," and co-pending and commonly-assigned U.S. patent application Ser. No. 18/417,483, filed Jan. 19, 2024, titled "METHODS FOR PRODUCING HYDROCARBON FLUIDS WITH REDUCED WATER-OIL RATIO BY UTILIZING OIL-WET PETROLEUM COKE PROPPANT PARTICLES DURING HYDRAULIC FRACTURING," the contents of all of which are incorporated by reference herein in their entirety.

FIELD

This disclosure relates generally to the field of hydraulic fracturing operations and proppant particles employed therein. More specifically, this disclosure relates to proppant particles formed from fluid coke and flexicoke, fracturing fluids including such proppant particles, and methods related thereto.

BACKGROUND

This section is intended to introduce various aspects of the art, which may be associated with embodiments of the present disclosure. This discussion is believed to assist in providing a framework to facilitate a better understanding of particular aspects of the present disclosure. Accordingly, it should be understood that this section should be read in this light, and not necessarily as admissions of prior art.

A wellbore can be drilled into a subterranean formation to promote removal (or production) of a material such as hydrocarbon, coal, mineral, water, and the like. In many cases, the subterranean formation needs to be stimulated in some manner to promote removal of the resource. Stimulation can include any operation performed upon the matrix of a subterranean formation to improve fluid conductivity therethrough, including hydraulic fracturing, which is a commonly used for unconventional reservoirs.

Hydraulic fracturing typically involves the pumping of large quantities of fracturing fluid into a subterranean formation (e.g., a low-permeability formation) under high hydraulic pressure to promote the formation of one or more fractures within the matrix of the formation and to create high-conductivity flow paths. Primary fractures extending from the wellbore and, in some instances, secondary fractures extending from the primary fractures are formed during a fracturing operation. These fractures may be vertical, horizontal, or a combination of directions forming a tortuous path.

Proppant particles are often included in the fracturing fluid. Once the fracturing fluid has been pumped into the subterranean formation, it is desired that such proppant particles could be transported into the fractures and settle therein. Upon pressure release, the proppant particles remaining in the fractures keep the fractures open by preventing them from collapsing, facilitating the flow of desired products such as hydrocarbons from the fractured formations into the wellbore through the propped fractures. The performance of the proppant can affect the recovery of the intended products such as hydrocarbons significantly.

Sand has been traditionally used as a proppant in hydraulic fracturing for the production of hydrocarbon products from unconventional wells. Various other types of other proppants have been proposed and available to substitute sand. Nonetheless, all these existing proppants suffer from one of more drawbacks such as high cost and limited hydrocarbon recovery rate. Thus, there is a genuine need of high-performance proppants, fracturing fluids, and hydraulic fracturing methods in the industry. This disclosure satisfies these and other needs.

SUMMARY

An aspect of this disclosure provides a fracturing fluid. The fracturing fluid includes a carrier fluid, as well as thermally post-treated fluid coke particles and/or thermally post-treated flexicoke proppant particles. The thermally post-treated fluid coke particles and/or thermally post-treated flexicoke proppant particles include fluid coke particles and/or flexicoke particles, respectively, that have been thermally post-treated to a temperature in a range from 400° C. to 1200° C. for a predetermined duration (e.g., from 1 minute to 24 hours).

Another aspect of this disclosure provides a method of utilizing such fracturing fluid. The method includes introducing the fracturing fluid into a subterranean formation. In various embodiments, the method also includes depositing at least a portion of the thermally post-treated fluid coke proppant particles and/or the thermally post-treated flexicoke proppant particles within hydraulic fractures in the subterranean formation to form a proppant pack.

Another aspect of this disclosure provides a method of making such fracturing fluid. The method includes producing the thermally post-treated fluid coke proppant particles and/or the thermally post-treated flexicoke proppant particles by thermally post-treating fluid coke particles and/or flexicoke particles, respectively, to a temperature in a range from 400° C. to 1200° C. for a predetermined duration that is in range from 1 minute to 24 hours. The method also includes mixing the thermally post-treated fluid coke proppant particles and/or the thermally post-treated flexicoke proppant particles with at least a carrier fluid, as well as optionally one or more other types of proppant particles and/or one or more additives.

These and other features and attributes of the disclosed aspects and embodiments of the present disclosure and their advantageous applications and/or uses will be apparent from the detailed description that follows.

BRIEF DESCRIPTION OF THE DRAWINGS

To assist those of ordinary skill in the relevant art in making and using the subject matter described herein, reference is made to the appended drawings, where.

Figure 1A:
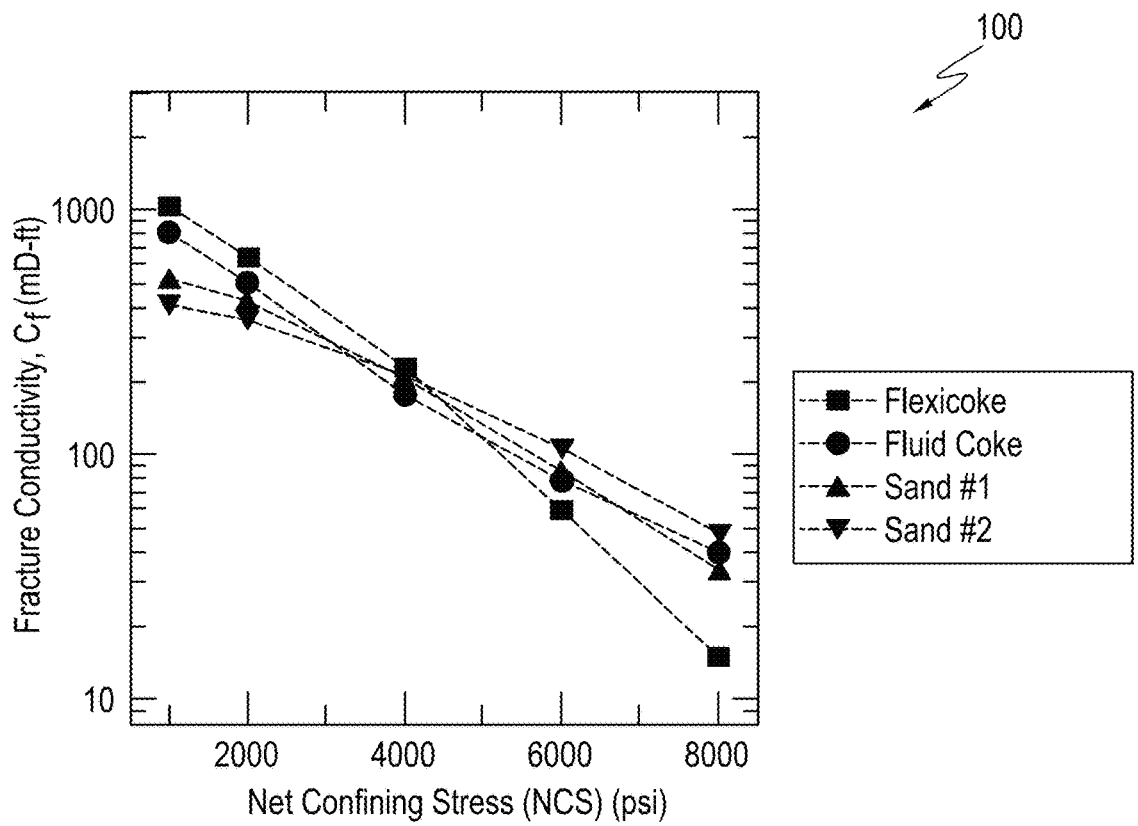
FIG. 1A is a graph of fracture conductivity versus net confining stress for 100-mesh granular materials, including a fluid coke sample, a flexicoke sample, and two sand samples.

It should be noted that the figures are merely examples of the present disclosure and are not intended to impose limitations on the scope of the present disclosure. Further, the figures are generally not drawn to scale, but are drafted for purposes of convenience and clarity in illustrating various aspects and embodiments of the present disclosure.

DETAILED DESCRIPTION

In the following detailed description section, the specific examples of the present disclosure are described in connection with preferred aspects and embodiments. However, to the extent that the following description is specific to one or more aspects or embodiments of the present disclosure, this is intended to be for exemplary purposes only and simply provides a description of such aspect(s) or embodiment(s). Accordingly, the present disclosure is not limited to the specific aspects and embodiments described below, but rather, includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition those skilled in the art have given that term as reflected in at least one printed publication or issued patent. Further, the present disclosure is not limited by the usage of the terms shown below, as all equivalents, synonyms, new developments, and terms or processes that serve the same or a similar purpose are considered to be within the scope of the present claims.

As used herein, the singular forms "a," "an," and "the" mean one or more when applied to any embodiment described herein. The use of "a," "an," and/or "the" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., +1%, +5%, +10%, +15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "any" means one, some, or all of a specified entity or group of entities, indiscriminately of the quantity.

As used herein, the term "apparent density," when used with reference to the density of proppant particles, refers to the density of the individual particles themselves along with any internal porosity that is inaccessible to invading fluids or gases, which may be expressed in grams per cubic centimeter ($g/cm^3$). The apparent density values provided herein are measured with standard Heliun pycnometry techniques, but can also be measured based on the American Petroleum Institute's Recommended Practice 19C (hereinafter "API RP-19C") standard, entitled "Measurement of Properties of Proppants Used in Hydraulic Fracturing and Gravel-packing Operations" (First Ed. May 2008, Reaffirmed June 2016).

The phrase "at least one," when used in reference to a list of one or more entities (or elements), should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the term "blast furnace coke" refers to any coal-derived coke suitable for use in a blast furnace for making steel.

As used herein, the term "carbon-to-hydrogen ratio" or "C/H ratio" refers to an amount of elemental carbon to elemental hydrogen within a petroleum composition. The C/H ratio is measured and reported on a mass basis according to ASTM D5373-21 entitled "Test Methods for Determination of Carbon, Hydrogen and Nitrogen in Analysis Samples of Coal and Carbon in Analysis Samples of Coal and Coke."

As used herein, the term "crush strength," when used with reference to proppant particles, refers to a method to characterize the degree to which proppant particles under compressive stress can withstand crushing (e.g., breaking or cracking). The crush strength is reported as a stress level and the values of the present disclosure are based on API RP-19C.

As used herein, the term "delayed coke" refers to the solid concentrated carbon material that is produced within delayed coking units via the delayed coking process. According to the delayed coking process, a preheated petroleum-derived feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which can have an outlet temperature of, e.g., around 895° F. to around 960° F. Exemplary outlet temperature ranges include around 900° F. to around 910° F., around 910° F. to around 920° F., around 920° F. to around 930° F., around 930° F. to around 940° F., around 940° F. to around 950° F., and around 950° F. to around 960° F., to name a few non-limiting examples. The heated feedstock then enters a reactor, referred to as a "coke drum," which can operate at temperatures of, e.g., around 780 OF to around 840° F. Exemplary ranges of reactor temperature include around 780° F. to around 790° F., around 790° F. to around 800° F., around 800° F. to around 810° F., around 810° F. to around 820° F., around 820° F. to around 830° F., and around 830° F. to around 840° F., to name a few non-limiting examples. Within the coke drum, the cracking reactions continue. The resulting cracked products then exit the coke drum as an overhead stream, while coke deposits in the coke drum. In general, this process is continued for a period of around 16 hours to around 24 hours to allow the coke drum to fill with coke. Exemplary ranges of specific cracking process times include around 16 hours to around 18 hours, around 18 hours to around 20 hours, around 20 hours to around 22 hours, and around 22 hours to around 24 hours, to name a few non-limiting examples. In addition, to allow the delayed coking unit to operate on a batch-continuous (or semi-continuous) basis, two or more coke drums are used. While one coke drum is on-line filling with coke, another coke drum can be steam-stripped, cooled, decoked (e.g., via hydraulically cutting the deposited coke with water), pressure-checked, and warmed up. Moreover, the overhead stream exiting the coke drum enters the fractionator, where naphtha and heating oil fractions are recovered. The heavy recycle material is then typically combined with preheated fresh feedstock and recycled back into the process.

Relatedly, the term "thermally post-treated delayed coke" as used herein refers to delayed coke that has been heat-treated to temperatures in a range from around 400° C. to around 1000° C. (e.g., around 400° C. to around 500° C., around 500° C. to around 600° C., around 600° C. to around 700° C. around 700° C. to around 800° C., around 800° C. to around 900° C., around 900° C. to around 1000° C., to name a few non-limiting examples) for a predetermined duration that is in a range from around 1 minute to around 24 hours (around 1 minute to around 1 hour, around 1 hour to around 2 hours, around 2 hours to around 4 hours, around 4 hours to around 6 hours, around 4 hours to around 8 hours, around 8 hours to around 10 hours, around 8 hours to around 12 hours, around 12 hours to around 14 hours, around 12 hours to around 16 hours, around 16 hours to around 18 hours, around 16 hours to around 20 hours, around 20 hours to around 22 hours, and around 20 hours to around 24 hours, to name a few non-limiting examples).

As used herein, the terms "example," exemplary," and "embodiment," when used with reference to one or more components, features, structures, or methods according to the present disclosure, are intended to convey that the described component, feature, structure, or method is an illustrative, non-exclusive example of components, features, structures, or methods according to the present disclosure. Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present disclosure.

As used herein, the term "flexicoke" refers to the solid concentrated carbon material produced via the FLEXICOKING™ process, which is a thermal cracking process utilizing fluidized solids and gasification for the conversion of heavy, low-grade hydrocarbon feeds into lighter hydrocarbon products (e.g., upgraded, more valuable hydrocarbons). Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement, which is typically about 496° C. to about 538° C. Exemplary ranges of reactor heat that may be used include around 496° C. to around 500° C., around 500° C. to around 510° C., around 510° C. to around 520° C., around 520° C. to around 530° C., around 530° C. to around 538° C., to name a few non-limiting examples. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

Relatedly, the terms "wet flexicoke fines" and "dry flexicoke fines" refer to two byproducts of the FLEXICOKING™ process. Such byproducts are collected as particles that were not recovered in the secondary cyclones of the heater. More specifically, the particles are collected first in the tertiary cyclone as dry flexicoke fines, and the smaller particles that travel past the tertiary cyclone are then recovered in the venturi scrubber as wet flexicoke fines.

As used herein, the term "fluid coke" refers to the solid concentrated carbon material remaining from fluid coking. The term "fluid coking" refers to a thermal cracking process utilizing fluidized solids for the conversion of heavy, low-grade hydrocarbon feeds into lighter products (e.g., upgraded hydrocarbons), producing fluid coke as a byproduct. The fluid coking process differs from the FLEXICOKING™ process that produces the Flexicoke in that the fluid coking process does not include a gasifier.

The term "fracture" (or "hydraulic fracture") refers to a crack or surface of breakage in a subterranean formation, that can be induced by an applied pressure or stress.

As used herein, the term "hydraulic conductivity" or "fracture conductivity" refers to the ability of a fluid to pass through a propped fracture at a particular level of applied compressive stress. This is based, at least in part, on the permeability of the proppant deposited within the hydraulic fractures. The hydraulic conductivity values provided herein are based on the American Petroleum Institute's Recommended Practice 19D (API RP-19D) standard, entitled "Measuring the Long-Term Conductivity of Proppants" (First Ed. May 2008, Reaffirmed May 2015).

As used herein, the term "metallurgical coke" refers to a type of coal-derived coke that is produced by heating coal, which causes fixed carbon to fuse to inherent ash and drives off a large percentage of the volatile matter. The resulting metallurgical coke can be formed in a range of different sizes, with the smallest particles being a fine powder (sometimes referred to as "coke breeze").

As used herein, the term "nanoindentation" refers to a method to resolve certain local mechanical properties of a material with a high degree spatial resolution. Nanoindentation measurements can be used to measure local effective hardness and modulus values in a material, and according to the present disclosure were performed using a nanoindenter equipped with a diamond Berkovich tip geometry that is driven onto proppant particle surfaces over a square grid of points separated by about 6 µm. The nanoindentation modulus ($E_r$) and the local hardness (H) are two mechanical properties determined from nanoindentation measurements, mathematically defined in Equation 5 and Equation 6. The nanoindentation modulus can be taken to approximate the material modulus. The local hardness is defined as the ratio of the maximum load and the indentation contact area.

The term "particle size(s)," when used herein with reference to a type of particles, refers to the diameter(s) of such particle(s). The term "particle size distribution," when used herein with reference to a type or a collection of particles, refers to the range of diameters for such particles, typically from the minimal to the maximal. The terms "average particle size distribution" and "D50" when used herein with reference to a type or a collection of particles, interchangeably mean the median particle size of the particles.

The term "petroleum coke" refers to a final carbon-rich solid material that is derived from oil refining. More specifically, petroleum coke is the carbonization product of high-boiling hydrocarbon fractions that are obtained as a result of petroleum processing operations. Petroleum coke is produced within a coking unit via a thermal cracking process in which long-chain hydrocarbons are split into shorter-chain hydrocarbons. As described herein, there are three main types of petroleum coke: delayed coke, fluid coke, and flexicoke. Each type of petroleum coke is produced using a different coking process; however, all three coking processes have the common objective of maximizing the yield of distillate products within a refinery by rejecting large quantities of carbon in the residue as petroleum coke.

The term "coal-derived coke" means any coke prepared from coal by, e.g., thermal treatment.

Relatedly, the term "coke" refers more generally to petroleum coke as well as other types of coke, such as metallurgical coke and blast furnace coke.

As used herein, the terms "proppant" and "proppant particle" refer to a solid material capable of maintaining open an induced fracture during and following a hydraulic fracturing treatment. The term "proppant pack" refers to a collection of proppant particles.

The terms "coke proppant" and "coke proppant particles" refer to a proppant based on or derived from a solid carbonaceous material produced from treating a carbon-containing material (e.g., oil (e.g., crude oil, vacuum pipestill, and the like), coal, and hydrocarbons) at an elevated temperature in an oxygen deficient environment. The elevated temperature can be at least 200, 250, 300, 350; 400, 450, 500, 600, 700, 800, 900, or even 1000° C. The carbonaceous material comprises the carbon element and optionally additional elements including but not limited to hydrogen, sulfur, vanadium, iron, and the like. The carbonaceous material preferably comprises the carbon element at a concentration of ≥50 wt %, e.g., from 50, 55, 60, 65, 70, wt %, to 75, 80, 85, 90, 95 wt %, to 96, 97, 98, 99 wt %, or even 100 wt %, based on the total weight of all elements in the carbonaceous material. The carbonaceous material preferably comprises the carbon element and hydrogen element at a combined concentration of ≥55 wt %, e.g., from 55, 60, 65, 70, wt %, to 75, 80, 85, 90, 95 wt %, to 96, 97, 98, 99 wt %, or even 100 wt %, based on the total weight of all elements in the carbonaceous material.

The term "non-coke proppant" means any proppant that does not comprise coke proppant particles. Examples of non-coke proppant include sand, ceramic proppants, glass proppants, and polymer proppants.

The term "lightweight proppant (LWP)" refers to proppants having an apparent density within a range of from around 1.2 g/cm$^3$ to around 2.2 g/cm$^3$ (e.g., from around 1.2, 1.3, 1.4, 1.5, 1.6 g/cm$^3$ to around 1.7, 1.8, 1.9, 2.0, 2.1, 2.2 g/cm$^3$), while the term "ultra-lightweight proppant (ULWP)" refers to proppants having an apparent density within a range from around 0.5 g/cm³ to around 1.2 g/cm³ (e.g., from around 0.5, 0.6, 0.7, 0.8 g/cm³ to around 0.9, 1.0, 1.1, 1.2 g/cm³). A coke proppant may or may not be an LWP. The term "non-LWP proppant" refers to proppants having apparent density higher than 2.2 g/cm³ (e.g., from around 2.3, 2.4, 2.5 to around 2.6, 2.8, 3.0, to 3.2, 3.4, 3.5 g/cm³.) A non-coke proppant may or may not be a non-LWP.

The term "microproppant" means proppant particles having particle sizes of at most 105 µm (140 mesh). The term "microproppant coke particles" means a collection of coke proppant particles having particle sizes of at most 105 µm, but potentially within a range from around 0.0001 µm to 105 µm (e.g., from around 0.0001, 0.001, 0.01, 0.1 µm to 0.5, 1.0, 2.0, 5.0, 8.0 10 µm, to 15, 20, 25, 30, 35, 40, 45 µm, to 50, 53, 55, 60, 63, 65 µm, to 74, 75, 80, 85, 88, 90, 95, 100, 105 µm). The term "petroleum coke fines" means a collection of microproppant coke particles that are derived from a petroleum source material.

As used herein, the term "pyrolysis coke" refers to a type of coke that is generated via hydrocarbon pyrolysis at temperatures higher than the coking processes for making petroleum coke.

The term "substantially," when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

The term "substantially free" or "essentially free" when used with reference to a component of a composition, interchangeably means that the composition comprises the component at a concentration of ≤10 wt %, ≤5 wt %, ≤3 wt %, ≤1 wt %, or 0 wt %, based on the total weight of the composition, depending on the details of the particular implementation.

As used herein, the term "thermal gravimetric analysis" or "TGA" refers to the weight loss versus the temperature (in ° C.) of a sample and represents the percent of degradables.

The term "wellbore" refers to a borehole drilled into a subterranean formation. The borehole may include vertical, deviated, highly deviated, and/or horizontal sections. The term "wellbore" also includes the downhole equipment associated with the borehole, such as the casing strings, production tubing, gas lift valves, and other subsurface equipment. Relatedly, the term "hydrocarbon well" (or simply "well") includes the wellbore in addition to the wellhead and other associated surface equipment.

Certain embodiments and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by a person having ordinary skill in the art.

Turning now to details of the present disclosure, as described above, even with the utilization of smaller-sized proppants such as 100-mesh sand, difficulties are still encountered with regard to effective proppant transport and uniform proppant deposition within the hydraulic fractures. The present disclosure improves this limitation and provides related advantages as well. In particular, the present disclosure provides thermally post-treated fluid coke proppant particles and thermally post-treated flexicoke proppant particles with enhanced mechanical properties, as well as methods of making such proppant particles and utilizing such proppant particles during hydraulic fracturing operations. More specifically, according to aspects and embodiments described herein, the thermally post-treated fluid coke and/or flexicoke proppant particles are produced by heat-treating fluid coke particles and/or flexicoke particles, respectively, to temperatures in a range from 400° C. to 1200° C. (e.g., around 400° C. to around 500° C. around 500° C. to around 600° C., around 600° C. to around 700° C. around 700° C. to around 800° C., around 800° C. to around 900° C. around 900° C. to around 1000° C., around 1000° C. to around 1100° C. and around 1100° C. to around 1200° C., to name a few non-limiting examples) for a predetermined duration (e.g., a duration from around 1 minute to around 24 hours (around 1 minute to around 1 hour, around 1 hour to around 2 hours, around 2 hours to around 4 hours, around 4 hours to around 6 hours, around 4 hours to around 8 hours, around 8 hours to around 10 hours, around 8 hours to around 12 hours, around 12 hours to around 14 hours, around 12 hours to around 16 hours, around 16 hours to around 18 hours, around 16 hours to around 20 hours, around 20 hours to around 22 hours, and around 20 hours to around 24 hours, to name a few non-limiting examples)) within a kiln or other suitable heating device. As described further herein, such thermal post-treatment of the fluid coke and/or flexicoke particles produces thermally post-treated fluid coke and/or flexicoke proppant particles with improved strength compared to the initial untreated (or "green") fluid coke and/or flexicoke particles, while still maintaining the advantageously low densities and correspondingly low settling velocities of such fluid coke and/or flexicoke particles as compared to non-coke proppants, such as sand. This, in turn, further enhances the behavior of such proppant particles within subterranean formations including relatively high in-situ stress conditions. Specifically, the thermally post-treated fluid coke and/or flexicoke proppant particles are capable of propping hydraulic fractures more effectively than both non-coke proppants (e.g., sand) and the green fluid coke and/or flexicoke particles that were utilized to create such proppant particles. Therefore, the production potential of the hydrocarbon well is increased as a result of the relatively high hydraulic conductivities within the hydraulic fractures.

In general, hydraulic fracturing operations rely on effective proppant particles to maintain sufficient hydraulic conductivity within the corresponding subterranean formation, thus enabling efficient hydrocarbon recovery. Effective proppant particles are typically associated with a variety of particular characteristics or properties, including efficient proppant particle transport within the fracturing fluid and sufficient crush strength to prop the hydraulic fractures upon the removal of the hydraulic pressure. To that end, the rate of settling (referred to as the "settling velocity") of a proppant particle within a fracturing fluid at least in part determines its transport capacity within a hydraulic fracture. The settling velocity (v) of a proppant particle may be determined according to Equation 1.

$$v = \frac{\rho_p - \rho_f}{18\eta} g\sigma^2 \qquad \text{Equation 1}$$

In Equation 1, $\rho_p - \rho_f$ is proportional to the density difference between the proppant particle and the carrier fluid; n is the viscosity of the carrier fluid; g is the gravitational constant; and $\sigma^2$ is proportional to the square of the proppant particle size. As will be appreciated, proppant particles having lower apparent densities and/ or smaller particle sizes settle at a slower rate within an identical carrier fluid (thus having better transport) compared to particles having higher apparent densities and/or larger particle sizes.

Proppant particle efficacy is further related to the fracture conductivity of the hydraulic fracture in which the proppant particle deposits to form a proppant pack. Such fracture conductivity is characterized by the fluid flow rate in the hydraulic fracture under gradient pressure. Specifically, fracture conductivity, $C_f$, is the product of the proppant pack permeability, k, and its thickness, h, and may be determined according to Equations 2 and 3.

$$C_f = kh \quad \text{Equation 2}$$

$$k = \frac{1}{C} \frac{(el)^3}{(1-\Phi)^2} \sigma_{eff}^2 \Phi_s^2 \quad \text{Equation 3}$$

In Equation 3, C is a constant; $\phi$ is the proppant pack void fraction; $\sigma$ is the average particle size distribution of the proppant particles; and $\Phi$ is a shape factor related to the sphericity of the proppant particles. In tension with settling velocity and transport properties, fracture conductivity favors proppant particles having larger average particle sizes, as well as thick proppant packs and narrow particle size distributions.

Fracture conductivity is related to the mechanical properties of proppant particles. These properties can be characterized using nanoindentation analysis according to the Oliver-Pharr scheme to obtain local mechanical properties of proppant particles. A nanoindenter makes measured indents using a calibrated diamond tip onto the surface of a material to establish a load-displacement curve. The load (P)-displacement (h) curve is established by contacting the tip of the nanoindenter onto the surface of a material to a maximum force, followed by retraction of the tip. The stiffness(S) is experimentally determined as the slope of the load-displacement curve during initial unloading, and the nanoindentation modulus is determined via the relationship represented by Equation 4.

$$S = \frac{dP}{dh} = \frac{2}{\sqrt{\pi}} E_r \sqrt{A(h)} \quad \text{Equation 4}$$

In Equation 4, A (h) is the projected area of the nanoindenter tip and (for a given geometry) is a known function of penetration depth. The nanoindentation modulus, $E_r$, is related to the Young's modulus, $E_S$, of the test sample, as determined by Equation 5.

$$\frac{1}{E_r} = \frac{1-v_i^2}{E_i} + \frac{1-v_s^2}{E_s} \quad \text{Equation 5}$$

In Equation 5, $E_s$ and $v_s$ are the Young's modulus and the Poisson's ratio, respectively, of the proppant particle, while $E_i$ and $v_i$ are the Young's modulus and the Poisson's ratio, respectively, of the nanoindenter tip. For a diamond nanoindenter, $E_i$ is 1140 gigapascals (GPa) and $v_i$ is 0.07, and the term $$\frac{1-v_i^2}{E_i}$$

is negligible for the samples of interest here.

Furthermore, the local hardness, H, of the material is determined according to Equation 6.

$$H = \frac{P_{max}}{A} \quad \text{Equation 6}$$

In Equation 6, $P_{max}$ is the maximum load and A is the contact area established by the nanoindenter tip under the maximum applied load.

In the data presented here, a diamond Berkovich tip geometry was utilized and was driven into the grain surface over an 8 by 8 square grid of points separated by approximately 6 microns. The prescribed load profile at each indentation site included a linear force ramp at 450 micronewtons per second (µN/s) to a maximum load of 9000 micronewtons (UN), followed by a constant hold for 10 seconds, and then a linear unloading at the same rate. For each sample, 10 different grains were examined to collect statistics on average nanoindentation modulus and hardness properties along with their standard deviations.

The retention of fracture conductivity is an important performance attribute for proppant particles. During primary production for hydrocarbon wells corresponding to unconventional subterranean formations, the dominant driving force for the production of the hydrocarbon fluids arises from the fluid pressure gradient between the rock formation and the wellbore to the surface. In the initial stages of production, the pore pressure (p) in the rock matrix is at a maximum, which counteracts the skeletal stresses ($\sigma$) arising from the weight of the overburden of the rock mass and acting perpendicular to the hydraulic fracture face. These features approximately counteract each other, leading to a net confining stress (NCS), defined as shown in Equation 7.

$$\text{NCS} = \sigma - p \quad \text{Equation 7}$$

During production, the pore pressure decreases as a function of time, while the skeletal stress remains constant. This results in a reduction of net confining stress, which implies that the compressive forces acting on the hydraulic fracture increase over time. As a result, the ability of the proppant to continue to provide a high degree of hydraulic conductivity for fluid flow becomes key for the efficient transport and production of hydrocarbon fluids to the surface.

As described herein, fluid coke and flexicoke proppant particles have several advantageous properties as compared to non-coke proppant particles (e.g., sand proppant particles), thus making a compelling case for the utilization of fluid coke and flexicoke proppant particles during hydraulic fracturing operations. In particular, the comparably low densities of fluid coke and flexicoke proppant particles allows for more efficient transport of such particles into the hydraulic fractures, particularly under conditions where settling out of the carrier fluid is a limiter in maximizing the propped fracture area. An example of the comparative behavior between fluid coke and flexicoke proppant particles and sand proppant particles is shown in FIG. 1A. Specifically, FIG. 1A is a graph 100 of fracture conductivity ($C_f$) versus net confining stress (NCS) for 100-mesh granular materials, including a fluid coke sample, a flexicoke sample, and two sand samples. All samples are 100-mesh in size, and the tests were run at 2 pounds per square feet (lb/ft²) proppant loading and 66° C.

From the standpoint of delivering adequate fracture conductivity at elevated net confining stress, the fluid coke and flexicoke samples have been found to be sufficient for a variety of subsurface scenarios. The right side of FIG. 1B, which is a graph 102 showing the ratio of fracture conductivity ($C_f/C_{f,0}$) retained as the net confining stress is increased from the initial measurement condition of 1,000 psi (i.e., NCS-NCS$_0$). The graph 102 of FIG. 1B utilizes the same conductivity data as the graph 100 of FIG. 1A, normalized to the initial fracture conductivity measured at 1,000 psi. From such graph 102, it is clear that the fluid coke sample, flexicoke sample, and sand samples exhibit fracture conductivity loss with increasing net confining stress, but the degree of retained conductivity is lower for the petroleum coke samples. Therefore, the aspects and embodiments described herein, which improve the fracture conductivity retention for fluid coke and flexicoke particles, are clearly desirable, particularly in sub-surface contexts where the proppant must handle more aggressive stress environments, which is common in deeper reservoirs.

As described further herein, fluid coke and flexicoke particles are both derived from a fluidized bed process where heavy fractions of aromatic-rich crude oil fractions are thermally cracked to produce a variety of lighter hydrocarbon products, while rejecting a fraction of the input carbon in the form of solid petroleum coke particles. Materials produced in this way typically are exposed to a higher degree of thermal severity than materials produced in a delayed coking reactor, which is based on a batch process that accomplishes a similar thermal cracking and carbon rejection of input feeds. Compared to delayed coke, fluid coke and flexicoke are typified by a lower degree of volatile matter. Volatile matter is composed of heavy hydrocarbons that are part of the petroleum coke particle matrix but can be liberated with additional thermal post-treatment to temperatures higher than the coking reactor operates. The volatile matter represents an incomplete transformation of residue molecules into relatively hydrogen deficient, aromatic domains that structurally order into layered complexes. Delayed coke typically has a higher level of volatile matter (e.g., around 8 wt % to around 15 wt %) than fluid coke and flexicoke (e.g., around 2 wt % to around 7 wt %), largely because delayed coking reactors operate at lower temperatures. Delayed coking reactors are typically fed with residue at around 490° C., and the resulting product exits the delayed coking reactor at around 430° C. In contrast, fluid coking reactors are typically maintained at around 530° C. Moreover, the higher volatile matter content implies a lower degree of polymerization and graphitization and may be at least partly responsible for the lower strength associated with delayed coke particles.

The mechanical properties of delayed coke particles are significantly improved via thermal post-treatment due to the liberation of substantial volatile matter during the thermal post-treatment process, which leads to enhanced ordering of the pseudo-graphitic domains, facilitated by the volumetric loss of the liberated material. However, this effect would be expected to be less pronounced for fluid coke and flexicoke, in part because green fluid coke and green flexicoke include less volatile matter to liberate upon thermal post-treatment, limiting any strengthening mechanisms due to ordering and consolidation of the morphology. However, according to aspects and embodiments described herein, thermal post-treatment of fluid coke and flexicoke particles advantageously provides a similar and unexpected mechanical benefit imparted to the fluid coke and flexicoke particles upon thermal post-treatment. Specifically, the thermal post-treatment of fluid coke and flexicoke particles according to aspects and embodiments described herein imparts both increased strength with relatively small density increase to the fluid coke and flexicoke particles, which is primarily a function of the target thermal post-treatment temperature. Moreover, the thermal post-treatment temperature can be adjusted to specifically tailor the degree of additional strength and density imparted to such fluid coke and flexicoke particles.

Figure 2A:
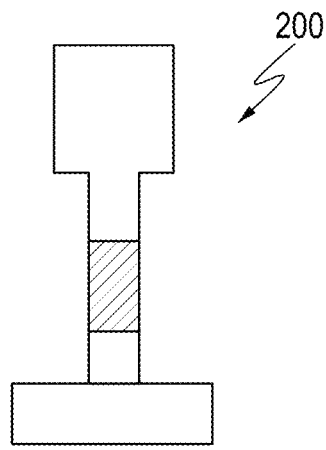
FIG. 2A is a schematic view of the utilized pellet die compression testing equipment.
Figure 2B:
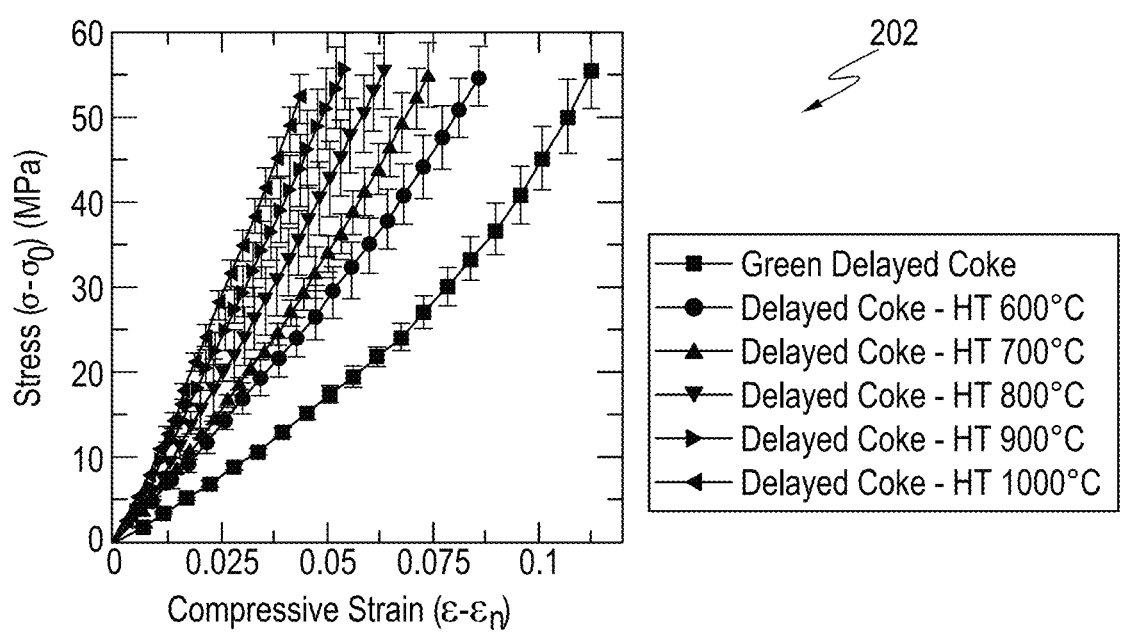
FIG. 2B is a graph of stress-strain curves under uniaxial compression of multiple delayed coke samples that have undergone varying levels of thermal post-treatment.
Figure 2C:
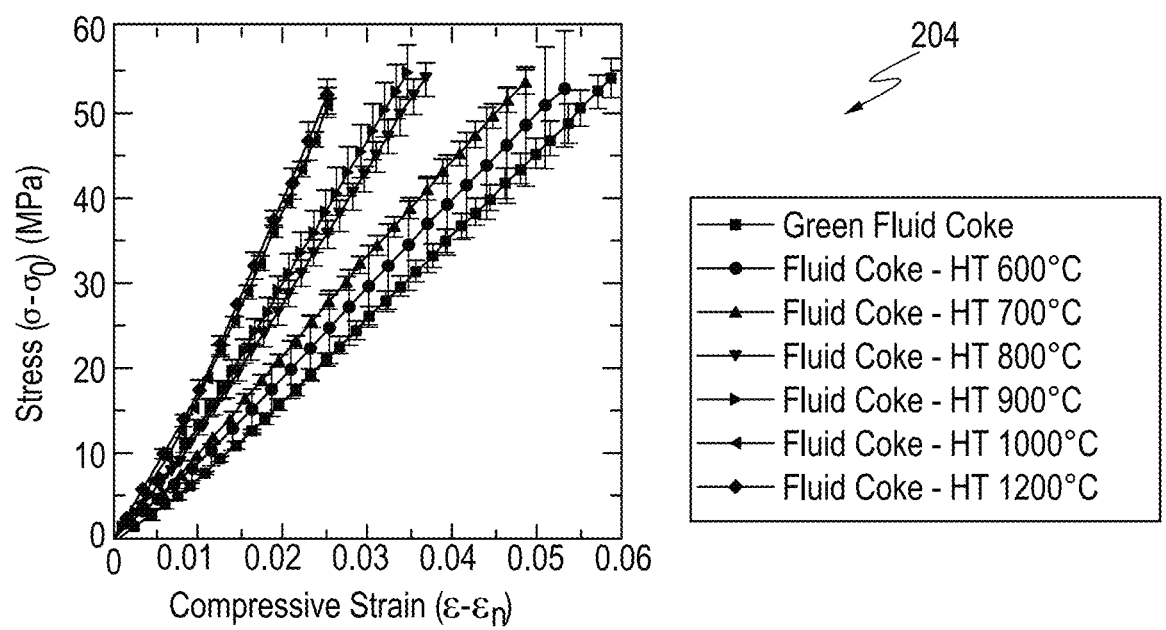
FIG. 2C is a graph of stress-strain curves under uniaxial compression of multiple fluid coke samples that have undergone varying levels of thermal post-treatment.

To demonstrate the effect of additional thermal post-treatment, fluid coke samples were thermally post-treated, and the properties of the fluid coke particles were derived and characterized as a function of the severity of the thermal post-treatment process. More specifically, the fluid coke samples were heated in a tube furnace to a target temperature, held for one hour, and then allowed to fully cool before removal. The fluid coke samples were immersed in a nitrogen gas flow to achieve pyrolysis-like conditions during the heat treatment. The extent of mechanical modification as a function of the thermal post-treatment temperature was then characterized. Specifically, the fluid coke samples were subjected to uniaxial compression using a pellet die compression test. This is illustrated by FIG. 2A, which is a schematic view of the utilized pellet die compression testing equipment 200. Approximately 1 gram of material was loaded into a 0.5-inch diameter pellet die and tamped down prior to compression in an Instron load frame. The grain packs were compressed at a rate of 0.15 millimeters per minute (mm/min) to 7500 newtons (N) (approximately 8,600 psi). The stress-strain curves for several thermally post-treated samples are shown in FIGS. 2B and 2C, where the stress-strain curves have been shifted to the reference state at which the applied stress is 1,000 psi. Specifically, FIG. 2B is a graph 202 of stress-strain curves under uniaxial compression of multiple delayed coke samples that have undergone varying levels of thermal post-treatment, while FIG. 2C is a graph 204 of stress-strain curves under uniaxial compression of multiple fluid coke samples that have undergone varying levels of thermal post-treatment. In particular, each stress-strain curve corresponds to a sample that is either green or has been thermally post-treated to a target temperature of 600° C., 700° C., 800° C., 900° C., 1000° C., or 1200° C., as indicated by the legends in FIGS. 2B and 2C. It can be seen from FIGS. 2B and 2C that the effective grain pack modulus, represented by the slope of the stress-strain curve, of the thermally post-treated particles increases with increasing thermal post-treatment temperature, as evidenced by the increase in slope of the stress-strain curves.

Figure 3:
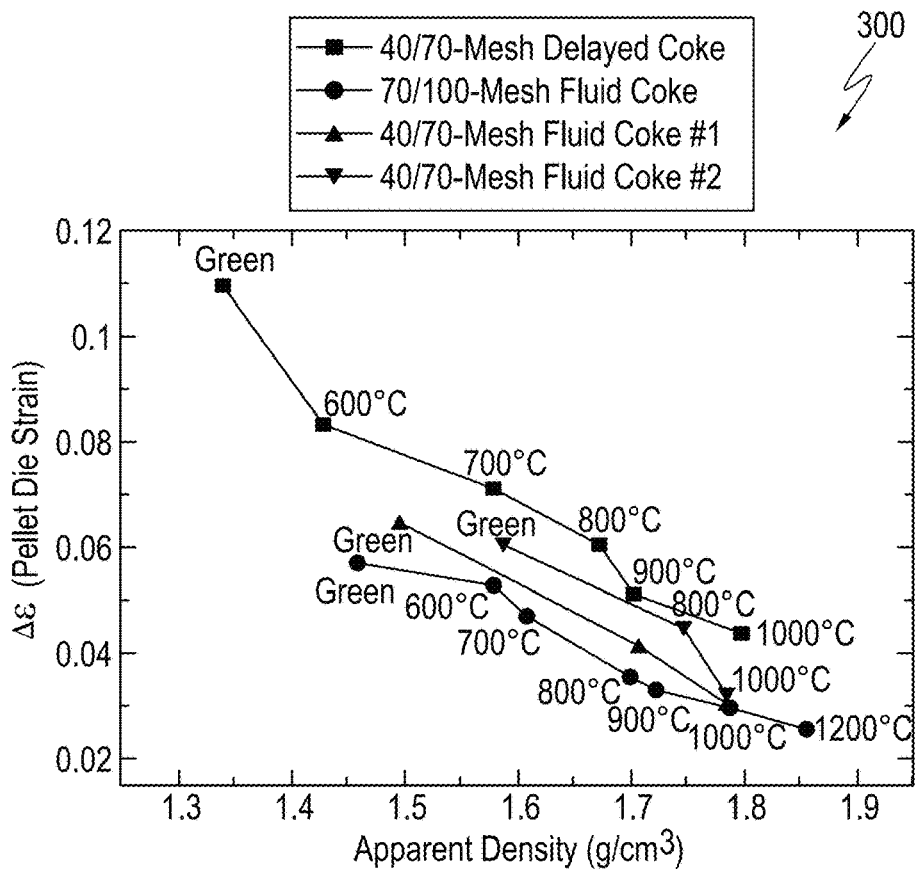
FIG. 3 is a graph of maximum pellet die strain versus apparent density for thermally post-treated fluid coke and delayed coke samples.

For each of the stress-strain curves in FIGS. 2B and 2C, the maximum strain (relative to the shifted reference) is plotted against the apparent density of the thermally post-treated particles, as measured by helium (He) pycnometry. This is illustrated by FIG. 3, which is a graph 300 of maximum pellet die strain versus apparent density for thermally post-treated fluid coke and delayed coke samples The mesh range of the samples (40/70 or 70/100) is indicated in the legend. Each point in each curve is annotated with the thermal post-treatment temperature of the respective sample. The responses of several fluid coke samples and a delayed coke sample are shown. Relative to the green sample, the maximum pellet die strain observed in the compression test decreases as a function of the degree of thermal post-treatment, with a commensurate increase in apparent density. It can further be seen that the stiffness increases by nearly a factor of two in both cases, representing a substantial increase in the effective grain pack modulus. This trend has been confirmed with other fluid coke samples, as indicated in FIG. 3, suggesting that this response to thermal post-treatment may be expected regardless of the fluid coke source.

Nanoindentation was performed on thermally post-treated samples to assess individual particle characteristics as a function of thermal post-treatment temperature. Samples were cast in epoxy in the form of 1-inch diameter billets and then polished smooth to expose flat grain surfaces for indentation. The indentation analysis follows the Oliver-Pharr scheme to derive local mechanical properties within the grain. At each indentation site, the load (P)-displacement (h) curve is measured as the tip is driven into the surface, to a maximum force of 9,000 µN and then retracted. The stiffness(S) is experimentally determined as the slope of the load-displacement curve during the initial unloading, as provided by Equation 4. The nanoindentation modulus is also determined via the relationship of Equation 4, where the nanoindentation modulus can be taken to approximate the material modulus. A diamond Berkovich tip geometry was driven into the grain surface over an 8 by 8 square grid of points separated by approximately 6 µm. For each sample, ten different grains were sampled to collect statistics on average nanoindentation modulus and hardness properties along with the standard deviations of such properties.

Figure 4:
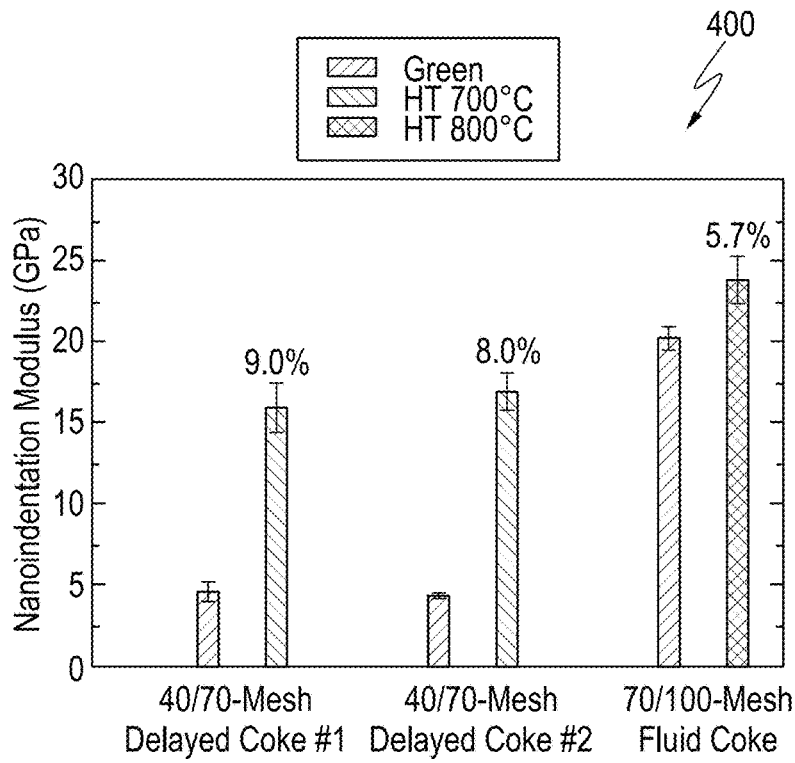
FIG. 4 is a bar graph showing nanoindentation modulus comparisons for green and thermally post-treated delayed coke and fluid coke samples.

FIG. 4 is a bar graph 400 showing nanoindentation modulus comparisons for green and thermally post-treated delayed coke and fluid coke samples. The mass loss percent for each thermally post-treated sample is also shown above each bar within the bar graph 400. As indicated by FIG. 4, green delayed coke is a relatively soft and plastic material, with a nanoindentation modulus of around 4 GPa. However, delayed coke that has been thermally post-treated to 700° C. exhibits a dramatic increase in nanoindentation modulus, with a resulting nanoindentation modulus value in a range of around 16 GPa to around 18 GPa, with a mass loss percent of around 8 wt % to around 9 wt %. By contrast, green fluid coke possesses a much higher nanoindentation modulus of around 20 GPa. Such higher nanoindentation modulus is a byproduct of the higher thermal severity of the fluid coking process, as well as the layered, onion-like morphology of the fluid coke particles that is produced by the continuous deposition of fluid coke material onto the growing fluidized particles during the fluid coking process. Moreover, fluid coke that has been thermally post-treated to 800° C. also exhibits an increase in nanoindentation modulus, with a resulting nanoindentation modulus in a range of around 22 GPa to around 24 GPa, with a lower mass loss percent of around 5.7 wt %.

Figure 5A:
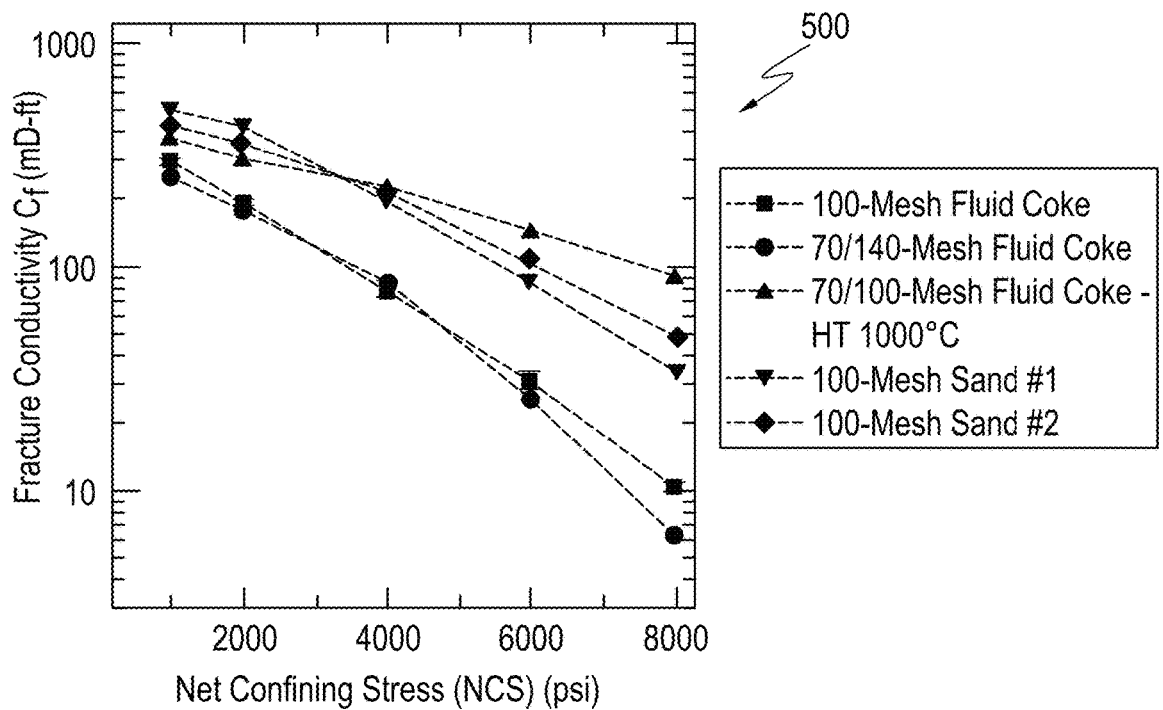
FIG. 5A is a graph of fracture conductivity versus net confining stress for multiple samples of fluid coke, thermally post-treated fluid coke, and sand.
Figure 5B:
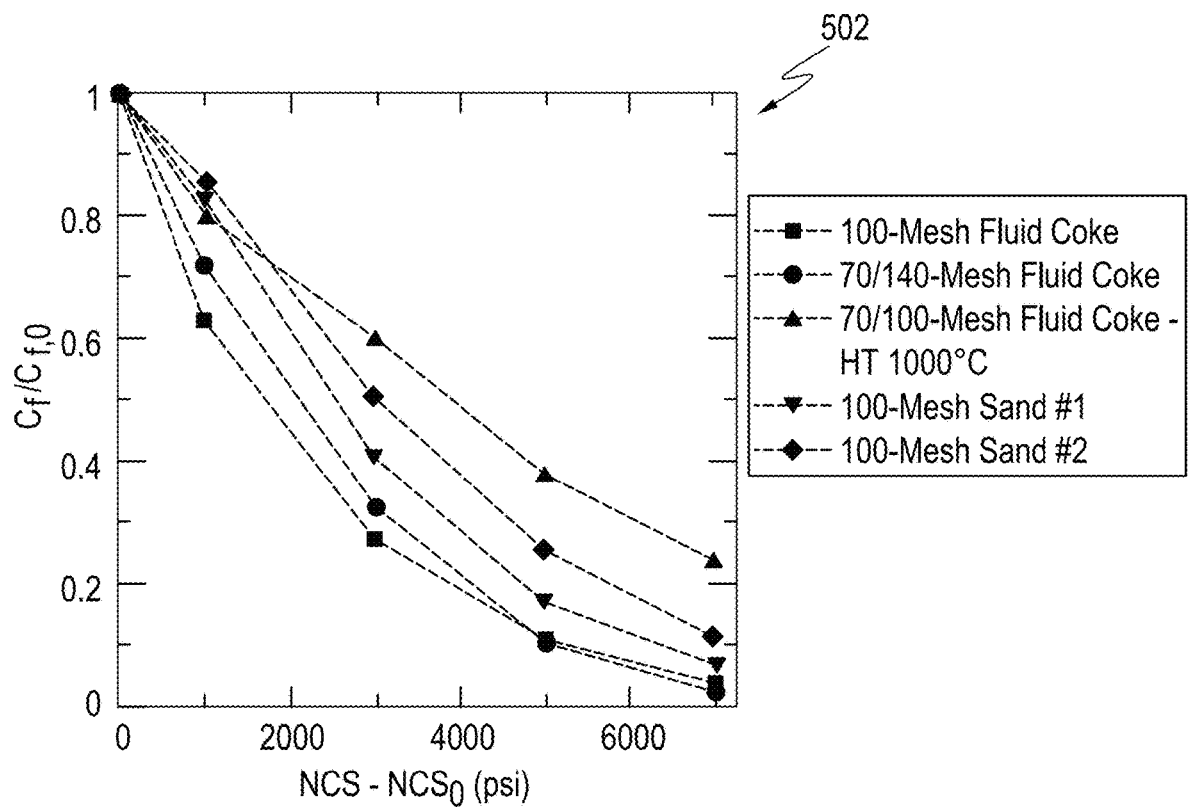
FIG. 5B is a graph of the same conductivity data as FIG. 5A, normalized to the initial fracture conductivity measured at 1,000 psi.

The beneficial mechanical effect of thermally post-treating fluid coke can be observed in the fracture conductivity data depicted in FIGS. 5A and 5B. In particular, FIG. 5A is a graph 500 of fracture conductivity ($C_f$) versus net confining stress (NCS) for multiple samples of fluid coke, thermally post-treated fluid coke, and sand, while FIG. 5B is a graph 502 of the same conductivity data as FIG. 5A, normalized to the initial fracture conductivity measured at 1,000 psi (denoted as $NCS_0$). In the graphs 500 and 502, the fracture conductivity is provided in units of millidarcy-feet (mD-ft), while the net confining stress is provided in units of psi. In addition, the mesh ranges for the samples are listed in the legend, and the tests were run at 2 lb/ft² proppant loading and around 66° C.

Figure 1B:
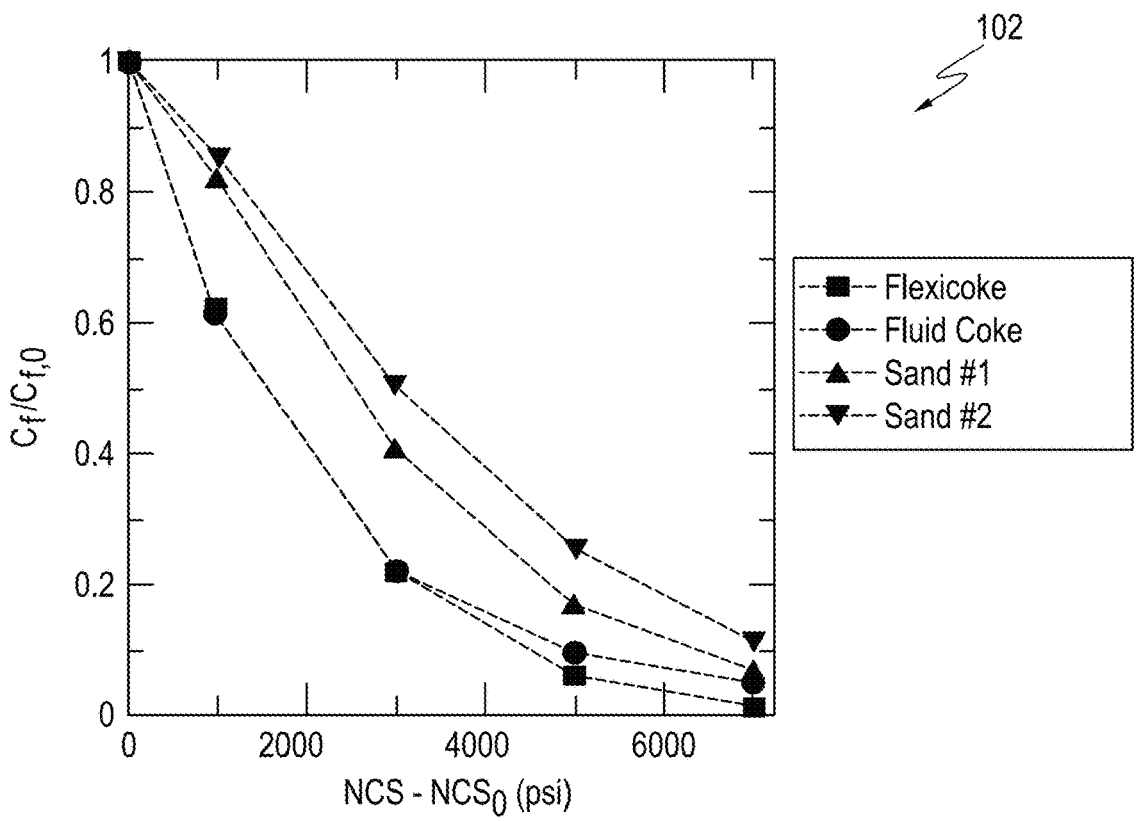
FIG. 1B is a graph showing the ratio of fracture conductivity retained as the net confining stress is increased from the initial measurement condition of 1,000 psi.

In FIGS. 5A and 5B, the data are plotted in a similar manner to the data of FIGS. 1A and 1B. However, a 70/100-mesh fluid coke sample that was thermally post-treated at 1,000° C. is compared to green fluid coke samples and sand samples of similar size. It can be seen that the retained fracture conductivity of the thermally post-treated fluid coke is much higher at elevated stress compared to the other samples, and the stress sensitivity is comparably lower.

The superior performance of the fluid coke as compared to sand, which possesses a higher nanoindentation modulus than fluid coke, is very surprising and unexpected for this class of material. It is noted that, although the thermally post-treated fluid coke has a higher density than the green starting material (i.e., around 1.8 g/cm³ versus around 1.45 g/cm³), the density is still considerably lower than that of sand (i.e., around 2.66 g/cm³) and so still provides an advantageously lower density proppant with superior mechanical strength.

Any suitable type(s) of fluid coke and/or flexicoke may be used to produce the thermally post-treated fluid coke proppant particles and/or thermally post-treated flexicoke proppant particles, respectively, as described herein. First, with regard to the utilization of flexicoke particles to produce the thermally post-treated flexicoke proppant particles described herein, the utilized flexicoke particles are produced via the FLEXICOKING™ process. Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

The gasification process of FLEXICOKING™ results in substantial concentration of metals in the flexicoke product and additionally allows for operational desulfurization of sulfur from the flexicoke. The gasification can be minimized or maximized to influence the sulfur content (where minimization corresponds to lower sulfur content). Accordingly, unlike cokes formed in other processes, flexicoke has a comparatively high metal content and a comparatively lower sulfur content that can be manipulated.

In various embodiments, the flexicoke particles may have a carbon content that is in a range from around 85 weight percent (wt %) to around 99 wt % (e.g., around 85, 86, 87, 88, 89, 90, 91, 92, 93, 94, 95, 96, 97, 98 or 99 wt %); a C/H ratio that is in a range from around 80:1 to around 95:1 (e.g., around 80:1, 82:1, 84:1, 86:1, 88:1, 90:1, 92:1, 94:1 or 95:1); and an impurities content (i.e., a weight percent of all components other than carbon and hydrogen) that is in a range from around 1 wt % to around 10 wt % (e.g., around 1, 2, 3, 4, 5, 6, 7, 8, 9 or 10 wt %). Flexicoke also has a higher metal content than other cokes. In particular, the flexicoke particles may have a combined vanadium and nickel content that is in a range from around 3,000 parts per million (ppm) to around 45,000 ppm (e.g. around 3,000, 5,000, 10,000, 15,000, 20,000 ppm to 25,000, 25,000, 30,000, 35,000, 40,000, 45,000 ppm). In addition, the flexicoke particles may have a sulfur content that is in a range from 0 wt % to around 5 wt %, as well as a nitrogen content that is in a range from 0 wt % to around 3 wt %.

In various embodiments, flexicoke fines are utilized as at least a portion of the utilized flexicoke particles. In such embodiments, the flexicoke fines may include wet flexicoke fines and/or dry flexicoke fines produced as a byproduct of the FLEXICOKING™ process. More specifically, the wet flexicoke fines and/or dry flexicoke fines are collected as flexicoke particles that were not recovered in the secondary cyclones of the heater within the Flexicoking reactor. More specifically, such particles are collected first in the tertiary cyclone as dry flexicoke fines, and the smaller particles that travel past the tertiary cyclone are then recovered in the venturi scrubber as wet flexicoke fines. Additionally or alternatively, in such embodiments, the flexicoke fines may include flexicoke particles that have been sieved and/or ground to a particle size of at most 105 μm (140 mesh) or, in some cases, a particle size of at most 88 μm (170 mesh). For embodiments in which the flexicoke particles are sieved, any suitable type(s) of filters, screens, and/or associated machinery may be utilized to separate bulk flexicoke granules into larger particles as well as smaller particles that are suitable for utilization as the flexicoke fines. Furthermore, for embodiments in which the flexicoke particles are ground, any suitable type(s) of grinding/milling technique(s) may be used to produce such flexicoke fines. For example, in some embodiments, flexicoke granules may be processed using hammer milling techniques, jet milling techniques, ball milling techniques, or the like, where each of these techniques generally involves crushing or pulverizing the flexicoke granules to a suitable size and shape. Moreover, those skilled in the art will appreciate that any number of other grinding, milling, or other processing techniques may be additionally or alternatively used, depending on the details of the particular implementation.

The utilized flexicoke particles may have apparent densities in a range from around 1.0 g/cm$^3$ to around 2.0 g/cm$^3$ (e.g., from around 1.2, 1.3, 1.4, 1.5, 1.6 g/cm$^3$ to around 1.7, 1.8, 1.9, 2.0 g/cm$^3$). Non-coke proppants (e.g., sand) generally have apparent densities of at least around 2.5 g/cm$^3$. Thus, the flexicoke particles have substantially lower apparent densities compared to non-coke, sand-based proppants, which is indicative of their comparably more effective transport and lower settling velocities within hydraulic fractures. Furthermore, depending at least in part on whether flexicoke fines are utilized as at least a portion of the flexicoke particles according to embodiments described herein, such flexicoke particles may have average particles sizes in a range from around 5 μm to around 500 μm.

Next, with regard to the utilization of fluid coke particles to produce the thermally post-treated fluid coke proppant particles described herein, the utilized fluid coke particles are obtained via a fluid coking process. Generally-speaking, flexicoke is considered to be a type (or subset) of fluid coke. Therefore, as expected, the fluid coke particles include a number of the same (or similar) characteristics as flexicoke. However, the fluid coking process may be manipulated in various ways to produce fluid coke particles having a number of distinctive characteristics. For example, the fluid coke particles may have a carbon content that is in a range from around 75 wt % to around 93 wt % (e.g., around 75, 76, 77, 78, 79, 80, 81, 82, 83, 84, 85, 86, 87, 88, 89, 90, 91, 92 or 93 wt %); a C/H ratio that is in a range from around 30:1 to around 50:1 (e.g., around 30:1, 32:1, 34:1, 36:1, 38:1, 40:1, 42:1, 44:1, 46:1, 48:1 or 50:1); and an impurities content that is in a range from around 5 wt % to around 25 wt % (e.g., around 5, 7, 9, 11, 13, 15, 17, 19, 21, 23 or 25 wt %). The fluid coke particles may also have a sulfur content that is in a range from around 3 wt % to around 10 wt % (e.g., around 3, 4, 5, 6, 7, 8, 9 or 10 wt %), as well as a nitrogen content that is in a range from around 0.5 wt % to around 3.0 wt % (e.g., around 0.5, 1.0, 1.5, 2.0, 2.5 or 3.0 wt %).

Moreover, in various embodiments, fluid coke fines are utilized as at least a portion of the utilized fluid coke particles. In such embodiments, the fluid coke fines may include fluid coke particles that have been sieved and/or ground to a particle size of at most 105 μm (140 mesh) or, in some cases, a particle size of at most 88 μm (170 mesh). For embodiments in which the fluid coke particles are sieved, any suitable type(s) of filters, screens, and/or associated machinery may be utilized to separate bulk fluid coke granules into larger particles as well as smaller particles that are suitable for utilization as the fluid coke fines. Furthermore, for embodiments in which the fluid coke particles are ground, any suitable type(s) of grinding/milling technique(s) may be used to produce such fluid coke fines. For example, in some embodiments, fluid coke granules may be processed using hammer milling techniques, jet milling techniques, ball milling techniques, or the like, where each of these techniques generally involves crushing or pulverizing the fluid coke e granules to a suitable size and shape. Moreover, those skilled in the art will appreciate that any number of other grinding, milling, or other processing techniques may be additionally or alternatively used, depending on the details of the particular implementation.

The utilized fluid coke particles may have apparent densities in a range from around 1.4 g/cm$^3$ to around 2.0 g/cm$^3$ (e.g., around 1.4, 1.5, 1.6, 1.7, 1.8, 1.9 or 2.0 g/cm$^3$). Furthermore, depending at least in part on whether fluid coke fines are utilized as at least a portion of the fluid coke particles according to embodiments described herein, such fluid coke e particles may have average particles sizes in a range from around 75 μm to around 500 μm (e.g., around 75, 100, 125, 150, 175, 200, 225, 250, 275, 300, 325, 350, 375, 400, 425, 450, 475 or 500 μm).

According to aspects and embodiments described herein, the mechanical properties of fluid coke and/or flexicoke particles are enhanced via a thermal post-treatment process. Such thermal post-treatment process may be performed in a kiln or other heating device that is configured to heat the particles to the desired temperatures. In some embodiments, the thermal post-treatment is performed to achieve pyrolysis-like conditions, which may be performed in a kiln, such as a rotary calciner. The particular temperature and duration of the thermal post-treatment may depend on a number of factors, including but not limited to the parameters and conditions of the hydraulic fracturing operation and corresponding subterranean formation for which the end-product is to be utilized. In various embodiments, the thermal post-treatment temperature is in a range from 400° C. to 1200° C. (e.g., 400, 450, 500, 550, 600, 650, 700, 750, 800, 850, 900, 950, 1000, 1050, 1100, 1150 or 1200° C.) or, in some cases, a range from around 400° C. to around 800° C. (e.g., 400, 450, 500, 550, 600, 650, 700, 750 or 800° C.) or a range from around 600° C. to around 800° C. (e.g., 600, 650, 700, 750 or 800° C.). Moreover, in various embodiments, the duration of the thermal post-treatment is in a range from around 1 minute to around 24 hours (e.g., around 1 minute to around 1 hour, around 1 hour to around 2 hours, around 2 hours to around 4 hours, around 4 hours to around 6 hours, around 4 hours to around 8 hours, around 8 hours to around 10 hours, around 8 hours to around 12 hours, around 12 hours to around 14 hours, around 12 hours to around 16 hours, around 16 hours to around 18 hours, around 16 hours to around 20 hours, around 20 hours to around 22 hours, and around 20 hours to around 24 hours, to name a few non-limiting examples) or, in some cases, a range from around 5 minutes to around 1 hour (e.g., around 5, 10, 15, 20, 25, 30 minutes to around 35, 40, 45, 50, 55, 60 minutes) or a range from around 15 minutes to around 30 minutes (e.g., around 15, 20, 25, 30 minutes). In some embodiments, the thermal post-treatment is in the presence of a gas, such as, for example, air, oxygen, steam, nitrogen, argon, one or more other types of inert gases, or any combination thereof.

The resulting thermally post-treated fluid coke and/or flexicoke proppant particles may have a nanoindentation modulus, as defined previously, in a range from around 5 GPa to around 50 GPa (e.g., 5, 10, 15, 20, 25, 30, 35, 40, 45, 50 GPa) or, in some cases, a range from around 10 GPa to around 40 GPa (e.g., 10, 15, 20, 25, 30, 35, 40 GPa). The thermally post-treated fluid coke and/or flexicoke proppant particles may have a local hardness value in a range from around 1 GPa to around 5 GPa (e.g., 1, 2, 3, 4, 5 GPa) or, in some case, a range from around 2 GPa to around 4 GPa (e.g., 2.0, 2.5, 3.0, 3.5, 4.0 GPa).

The thermally post-treated fluid coke and/or flexicoke proppant particles may have a carbon content in a range from around 60 wt % to around 99.5 wt % (e.g., around 60, 65, 70, 75, 80, 85, 90, 95, 96, 97, 98, 99, 99.5 wt %) or, in some cases, in a range from around 75 wt % to around 93 wt % (e.g., around 75, 76, 77, 78, 79, 80, 81, 82, 83, 84, 85, 86, 87, 88, 89, 90, 91, 92, 93 wt %). The thermally post-treated fluid coke and/or flexicoke proppant particles may have a C/H ratio in a range from around 25:1 to around 100:1 (e.g., around 25:1, 30:1, 35:1, 40:1, 45:1, 50:1, 55:1, 60:1, 65:1, 70:1, 75:1, 80:1, 85:1, 90:1, 95:1 or 100:1) or, in some cases, in a range from around 30:1 to around 95:1 (e.g., around 30:1, 35:1, 40:1, 45:1, 50:1, 55:1, 60:1, 65:1, 70:1, 75:1, 80:1, 85:1, 90:1 or 95:1).

The thermally post-treated fluid coke and/or flexicoke proppant particles may have a percent degradables, as measured by TGA, in a range from 0% to around 3% (e.g., around 0%, 0.5%, 1.0%, 1.5%, 2.0%, 2.5% or 3.0%). The thermally post-treated fluid coke and/or flexicoke proppant particles may have an impurities content (weight percent of all components other than carbon and hydrogen) in a range from around 1 wt % to around 25 wt % (e.g., around 1%, 5%, 10%, 15%, 20% or 25%) or, in some cases, in a range from around 5 wt % to around 20 wt % (e.g., around 5%, 10%, 15%, or 20%).

The thermally post-treated fluid coke and/or flexicoke proppant particles may have a sulfur content in a range from 0 wt % to around 10 wt % (e.g., 0, 1, 2, 3, 4, 5, 6, 7, 8, 9, or 10 wt %) or, in some cases, in a range from around 1 wt % to around 5 wt % (e.g., 1, 2, 3, 4 or 5 wt %). The thermally post-treated fluid coke and/or flexicoke proppant particles may have a nitrogen content in a range from 0 wt % to around 3 wt % (e.g., 0, 0.5, 1.0, 1.5, 2.0, 2.5 or 3.0 wt %) or, in some cases, in a range from around 0.5 wt % to around 2.5 wt % (e.g., 0.5, 1.0, 1.5, 2.0 or 2.5 wt %).

The apparent densities of the thermally post-treated fluid coke and/or flexicoke proppant particles may be in a range from around 1.0 g/cm$^3$ to around 2.2 g/cm$^3$ (e.g., from around 1.0, 1.1, 1.2, 1.3, 1.4, 1.5, 1.6 g/cm$^3$ to around 1.7, 1.8, 1.9, 2.0, 2.1, 2.2 g/cm$^3$). Non-coke sand proppant particles generally have apparent densities of at least around 2.5 g/cm$^3$. Thus, the thermally post-treated fluid coke and/or flexicoke proppant particles described herein have substantially lesser apparent densities compared to non-coke sand proppant particles, which is indicative of their comparably more effective transport and lower settling velocities within hydraulic fractures.

Non-coke, sand-based proppant particles have particle sizes ranging from around 100 µm to around 1,000 µm. The thermally post-treated fluid coke and/or flexicoke proppant particles described herein have comparable or smaller particles sizes, having an average particle size distribution in a range from around 5 µm to around 500 µm (e.g., 5, 10, 25, 50, 75, 100, 125, 150, 175, 200, 225, 250, 275, 300, 325, 350, 375, 400, 425, 450, 475 or 500 µm). Moreover, the deformation of the thermally post-treated fluid coke and/or flexicoke proppant particles is at least partially size dependent. In some embodiments, the crush strength of the thermally post-treated fluid coke and/or flexicoke proppant particles may be in a range from around 3,000 psi to around 15,000 psi (e.g., 3,000, 4,000, 5,000, 6,000, 7,000, 8,000, 9,000, 10,000, 11,000, 12,000, 13,000, 14,000 or 15,000 psi) or, in some cases, in a range from around 3,000 psi to around 6,000 psi (e.g., 3,000, 3,500, 4,000, 4,500, 5,000, 5,500 or 6,000 psi). Furthermore, the long-term fracture conductivity of a proppant pack formed at least in part from the thermally post-treated fluid coke and/or flexicoke proppant particles described herein is comparable to proppant packs formed entirely from sand proppant particles, particularly at comparable particle sizes.

Turning to details regarding exemplary characteristics of the fracturing fluid in which the thermally post-treated fluid coke and/or flexicoke proppant particles described herein may be employed, such fracturing fluid may include (in addition to the thermally post-treated fluid coke and/or flexicoke proppant particles) a flowable carrier fluid, one or more optional additives, and (optionally) one or more other types of proppant particles. In various embodiments, the fracturing fluid is formulated at the well site in a mixing process that is conducted concurrently with the pumping of the fracturing fluid into the wellbore during the hydraulic fracturing process. When the fracturing fluid is formulated at the well site, the thermally post-treated fluid coke and/or flexicoke proppant particles may be added in a manner similar to known methods for adding proppant to fracturing fluid.

The carrier fluid according to the present disclosure may be an aqueous carrier fluid including water or a nonaqueous carrier fluid that is substantially free of water. Aqueous carrier fluids may include, for example, fresh water, salt water (including seawater), treated water (e.g., treated production water), one or more other forms of aqueous fluid, or any combination thereof. One aqueous carrier fluid class is often referred to as slickwater, and the corresponding fracturing operations are often referred to as slickwater fracturing operations. Nonaqueous carrier fluids may include, for example, oil-based fluids (e.g., hydrocarbon, olefin, mineral oil), alcohol-based fluids (e.g., methanol), or any combination thereof. In various embodiments, the viscosity of the carrier fluid may be altered by foaming or gelling. Foaming may be achieved using, for example, air or other gases (e.g., $CO_2$, $N_2$), alone or in combination. Gelling may be achieved using, for example, guar gum (e.g., hydroxypropyl guar), cellulose, or other gelling agents, which may or may not be crosslinked using one or more crosslinkers, such as polyvalent metal ions or borate anions, among other suitable crosslinkers.

In some instances, the carrier fluid used according to embodiments described herein includes one or more aqueous carrier fluid types, particularly in light of the large volumes of fluid that are typically required (e.g., potentially around 60,000 to around 1,000,000 gallons per wellbore (e.g., around 60,000, 100,000, 150,000, 200,000, 250,000, 300,000, 350,000, 400,000, 450,000, 500,000, 550,000, 600,000, 650,000, 700,000, 750,000, 800,000, 850,000, 900,000, 950,000 or 1,000,000 gallons per wellbore)). The aqueous carrier fluid may or may not be gelled. The utilization of gelled aqueous carrier fluids (either crosslinked or un-crosslinked) may facilitate better proppant particle transport (i.e., reduce settling), as well as provide improved physical and chemical strength to withstand the temperatures, pressures, and shear stresses encountered by the fracturing fluid during a hydraulic fracturing operation. In some instances, the fracturing fluid includes an aqueous carrier fluid, which may or may not be foamed or gelled, and an acid (e.g., HCl) to further stimulate and enlarge pore areas of the matrix of fracture surfaces. It is to be appreciated that the low density of the thermally post-treated fluid coke and/or flexicoke proppant particles described herein may allow a reduction or elimination of the need to foam or gel the carrier fluid. In addition, certain fracturing fluids suitable for use according to embodiments described herein may contain one or more additives. Such additives may include but are not limited to one or more acids, one or more biocides, one or more breakers, one or more corrosion inhibitors, one or more crosslinkers, one or more friction reducers (e.g., polyacrylamides), one or more high-viscosity friction reducers, one or more gels, one or more crosslinked gels, one or more oxygen scavengers, one or more pH control additives, one or more scale inhibitors, one or more surfactants, one or more weighting agents, one or more inert solids, one or more fluid loss control agents, one or more emulsifiers, one or more emulsion thinners, one or more emulsion thickeners, one or more viscosifying agents, one or more foaming agents, one or more stabilizers, one or more chelating agents, one or more mutual solvents, one or more oxidizers, one or more reducers, one or more clay stabilizing agents, or any combination thereof.

With regard to the utilization of thermally post-treated fluid coke and/or flexicoke proppant particles during hydraulic fracturing operations according to aspects and embodiments described herein, the present disclosure provides methods of hydraulic fracturing using a fracturing fluid including thermally post-treated fluid coke and/or flexicoke proppant particles. Such thermally post-treated fluid coke and/or flexicoke proppant particles may be used, alone or in combination with one or more other types of proppant particles, during the hydraulic fracturing operation. That is, the thermally post-treated fluid coke and/or flexicoke proppant particles may form the entirety of a proppant pack or may form an integral part of a proppant pack. Other proppant types that may be utilized with the thermally post-treated fluid coke and/or flexicoke proppant particles include but are not limited to non-coke proppants (e.g., 100-mesh sand, crushed granite, and/or ceramic beads), lightweight proppants (LWPs), and ultra-LWPs (ULWPs). Moreover, in some embodiments, proppants formed at least in part from fly ash may be utilized with the thermally post-treated fluid coke and/or flexicoke proppant particles described herein. Furthermore, in various embodiments, one or more other types of coke proppant particles may be utilized along with the thermally post-treated fluid coke and/or flexicoke proppant particles. Such other type(s) of coke proppant particles may include but are not limited to fluid coke particles, flexicoke particles, delayed coke particles, thermally post-treated delayed coke particles, pyrolysis coke particles, coal-derived coke particles (e.g., blast furnace coke particles and/or metallurgical coke particles), and/or microproppant coke particles. Proppants including other materials are also within the scope of the present disclosure, provided that any such selected proppants are able to maintain their integrity upon removal of hydraulic pressure within an induced hydraulic fracture, such that around 80%, preferably around 90%, and more preferably around 95% or greater of the particle mass of the proppant particles retains integrity when subjected to 5,000 psi of stress, a condition that is also met by the thermally post-treated fluid coke and/or flexicoke proppant particles described herein. That is, both the thermally post-treated fluid coke and/or flexicoke proppant particles and any other type(s) of proppant particles utilized according to embodiments described herein are capable of maintaining mechanical integrity upon fracture closure, as such particles (at least partially) intermingle or otherwise associate to form functional proppant packs for a successful hydraulic fracturing operation.

The methods described herein include the preparation of the fracturing fluid, which is not considered to be particularly limited because the thermally post-treated fluid coke and/or flexicoke proppant particles are capable of transportation in dry form or as part of a wet slurry from a manufacturing site (e.g., a refinery or synthetic fuel plant). Dry and wet forms may be transported via truck or rail, and wet forms may further be transported via pipelines. The transported dry and/or wet forms of the thermally post-treated fluid coke and/or flexicoke proppant particles may be added to the carrier fluid, including the optional additives and/or any other type(s) of proppant particles, at a production site, either directly into a wellbore or by pre-mixing in a hopper or other mixing equipment. For example, in some embodiments, slugs of the dry and/or wet forms of the thermally post-treated fluid coke and/or flexicoke proppant particles are added directly to the fracturing fluid (e.g., as it is introduced into the wellbore). In other embodiments, such as when other type(s) of proppant particles are combined with the thermally post-treated fluid coke and/or flexicoke proppant particles, a portion or all of the fracturing fluid is pre-mixed at the production site, or each proppant type is added directly to the fracturing fluid separately. Any other suitable mixing or adding of the thermally post-treated fluid coke and/or flexicoke proppant particles to produce a desired fracturing fluid composition may also be used, without departing from the scope of the present disclosure.

The methods of hydraulic fracturing suitable for use in one or more embodiments described herein involve pumping the fracturing fluid including the thermally post-treated fluid coke and/or flexicoke proppant particles at a high pump rate into a subterranean formation to form hydraulic fractures in the subterranean formation. In various embodiments, this process is conducted one stage at a time along a wellbore. Specifically, the stage of interest is hydraulically isolated from any other stages that have been previously hydraulically fractured and propped. In some embodiments, the stage of interest includes perforation clusters within the production casing string of the wellbore, which enable the fracturing fluid to flow out of the wellbore and into the subterranean formation. In some embodiments, the pump rate of the fracturing fluid during the hydraulic fracturing operation is at least around 20 barrels per minute (bbl/min) (0.05 cubic meters per second (m³/s)), preferably at least around 30 bbl/min (0.08 m³/s), and more preferably at least around bbl/min (0.14 m³/s) and at most around 1,000 bbl/min (2.73 m³/s) at one or more time durations during the hydraulic fracturing operation (e.g., the rate may be constant, steadily increased, or pulsed). These high rates may, in some embodiments, be utilized after around 10% of the entire volume of fracturing fluid to be pumped into the subterranean formation has already been injected. That is, at the early periods of the hydraulic fracturing operation, the pump rate may be lower and as hydraulic fractures begin to form, the pump rate may be increased. Generally, the average pump rate of the fracturing fluid throughout the hydraulic fracturing operation may be around 10 bbl/min (0.03 m³/s), preferably around 15 bbl/min (0.04 m³/s), and more preferably at least around 25 bbl/min (0.07 m³/s) and at most around 250 bbl/min (0.68 m³/s). Typically, the pump rate of the fracturing fluid during the hydraulic fracturing operation for more than 30% of the time required to complete the hydraulic fracturing with respect to a particular stage is in the range of around 20 bbl/min (0.05 m³/s) to around 150 bbl/min (0.41 m³/s), or around 40 bbl/min (0.11 m³/s) to around 120 bbl/min (0.33 m³/s), or around 40 bbl/min (0.11 m³/s) to around 100 bbl/min (0.27 m³/s).

In various embodiments, the methods of hydraulic fracturing described herein may be performed such that the concentration of the thermally post-treated fluid coke and/or flexicoke proppant particles (and any other type(s) of proppant particles) within the injected fracturing fluid is altered on-the-fly or in real-time while the hydraulic fracturing operation is being performed, such that the hydraulic pressure is maintained in the subterranean formation and the hydraulic fractures. For example, in some embodiments, the initially-injected fracturing fluid is injected at a low pump rate and includes around 1 weight percent (wt %) proppant particles (i.e., including the thermally post-treated fluid coke and/or flexicoke proppant particles and any other type(s) of proppant particles) based on the total weight of the fracturing fluid (i.e., including the carrier fluid, the thermally post-treated fluid coke and/or flexicoke proppant particles, any other type(s) of proppant particles, and any additives). As hydraulic fractures begin to form and grow, the pump rate may be increased, and the concentration of the proppant particles may be increased in a stepwise fashion (with or without a corresponding stepwise increase in pump rate), with a maximum concentration of total proppant particles potentially reaching around 2.5 wt % to around 20 wt %, for example, based on the total weight of the fracturing fluid. For example, the maximum concentration of total proppant particles may reach at least 2.5 wt %, preferably at least 8 wt %, and more preferably at least 16 wt % based on the total weight of the fracturing fluid. In some embodiments, all of the proppant particles are coke particles, at least a portion of which are the thermally post-treated fluid coke and/or flexicoke proppant particles described herein. In other embodiments, at one or more time periods during the hydraulic fracturing operation, at least around 2 wt % to around 100 wt % of any proppant particles suspended within the fracturing fluid are coke particles, such as at least around 2 wt %, preferably at least around 15 wt %, more preferably at least around 25 wt %, and up to 100 wt % in some cases.

In various embodiments, at least a portion of the thermally post-treated fluid coke and/or flexicoke proppant particles are coated. Coatings are often provided on sand proppant particles used in hydraulic fracturing operations to either improve the flowability of the particles or to mitigate the flowback of the particles during subsequent production operations. Such types of coatings are within the scope of this disclosure. It is possible to introduce coated thermally post-treated fluid coke and/or flexicoke proppant particles at any stage of the hydraulic fracturing operation with the resulting composition being either a mixture of coated and uncoated thermally post-treated fluid coke and/or flexicoke proppant particles or entirely coated thermally post-treated fluid coke and/or flexicoke proppant particles.

In various embodiments, the thermally post-treated fluid coke and/or flexicoke proppant particles are introduced into the subterranean formation during at least a portion of the pad phase of the hydraulic fracturing operation to allow the thermally post-treated fluid coke and/or flexicoke proppant particles to travel with the fracturing fluid into the tips (or at least within proximity to the tips) of the formed hydraulic fractures. In such embodiments, the thermally post-treated fluid coke and/or flexicoke proppant particles may also be introduced into the subterranean formation during at least a portion of the later phases of the hydraulic fracturing operation such that the later-introduced slurry of fracturing fluid and thermally post-treated fluid coke and/or flexicoke proppant particles continue to displace the earlier-introduced slurry of fracturing fluid and thermally post-treated fluid coke and/or flexicoke proppant particles further away from the wellbore. Moreover, in some embodiments, the thermally post-treated fluid coke and/or flexicoke proppant particles are introduced into the subterranean formation throughout the hydraulic fracturing operation, either continuously or intermittently. In such embodiments, the ratio of thermally post-treated fluid coke and/or flexicoke proppant particles to other type(s) of proppant particles, if any, introduced into the subterranean formation may be maintained at a steady (or substantially steady) value, or the ratio may be modified as the hydraulic fracturing operation progresses.

The hydraulic fracturing methods described herein may be performed in drilled hydrocarbon-producing wellbores including vertical, deviated, highly deviated, and/or lateral sections. Such wellbores may be drilled into various types of unconventional subterranean formations, including but not limited to tight sandstone formations, tight carbonate formations, shale gas formations, coal bed methane formations, and/or tight oil formations. As described herein, such wellbores are typically completed using casing strings that are cemented into the subterranean formation. To contact the subterranean formation, a number of perforation clusters are typically created through the production casing string, in which case the wellbore may be referred to as a plug and perforated ("plug-and-perf") cased-hole completion. Alternative completion techniques may be used without departing from the scope of the present disclosure, but in each completion technique, a finite length of the wellbore is exposed for hydraulic fracturing and injection of the fracturing fluid. This finite section is referred to herein as a "stage." In plug-and-perf completions, the stage length may be based on a distance over which the tubular and cement has been perforated, and may be in excess of around 25 ft, but more typically in excess of around 100 ft.

During the plug-and-perf process, the stage of interest may be isolated using one or more diversions materials s (e.g., dissolvable plugs) such that the pressurized fracturing fluid flows through the perforation clusters within the particular stage and into the subterranean formation to generate one or more hydraulic fractures in only the stage area. For each linear foot of the stage, at least around 6 barrels (0.95 cubic meters (m³)), preferably around 24 barrels (3.8 m³), and more preferably at least 60 barrels (9.5 m³) and at most 6,000 barrels (953.9 m³) of fracturing fluid may be injected to grow the hydraulic fractures. In certain embodiments, for each linear foot of the stage, at least around 0.3 barrels (0.05 m³), preferably around 1.1 barrels (0.2 m³), and more preferably at least 2.8 barrels (0.45 m³) and at most 285 barrels (45.3 m³) of proppant particles (i.e., including the thermally post-treated fluid coke and/or flexicoke proppant particles and any other type(s) of proppant particles) may be injected to prop the hydraulic fractures.

Figure 6:
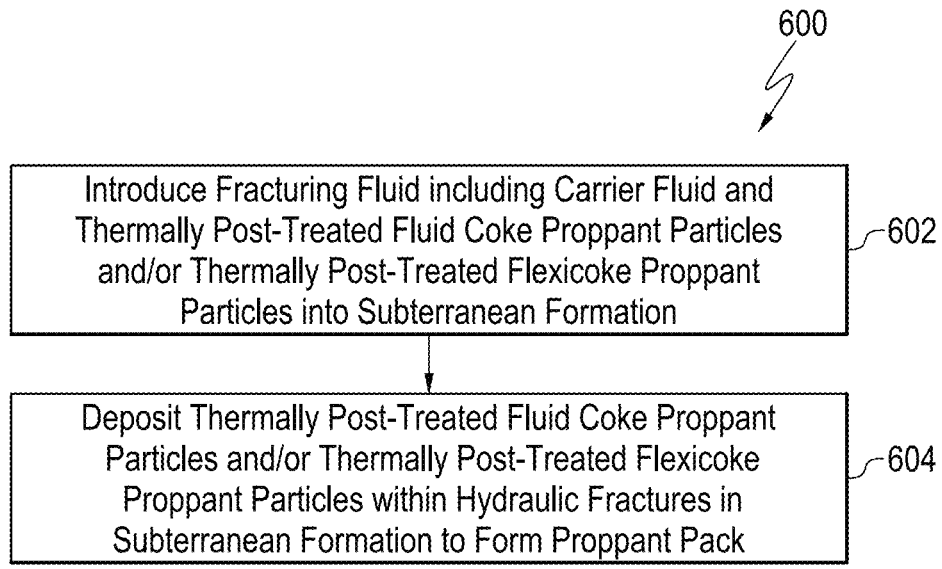
FIG. 6 is a process flow diagram of an exemplary method of utilizing the fracturing fluid described herein during a hydraulic fracturing operation.

FIG. 6 is a process flow diagram of an exemplary method 600 of utilizing the fracturing fluid described herein during a hydraulic fracturing operation. The method 600 may begin at block 602, at which a fracturing fluid including a carrier fluid and thermally post-treated fluid coke and/or flexicoke proppant particles is introduced into a subterranean formation. According to aspects and embodiments described herein, such thermally post-treated fluid coke and/or flexicoke proppant particles include fluid coke and/or flexicoke particles, respectively, that have been thermally post-treated (or heat-treated) to a temperature in a range from 400° C. to 1200° C. for a predetermined duration, which may be in a range from 1 minute to 24 hours. Furthermore, in various embodiments, at block 604, at least a portion of the thermally post-treated fluid coke and/or flexicoke proppant particles are deposited within hydraulic fractures in the subterranean formation to form a proppant pack.

Figure 7:
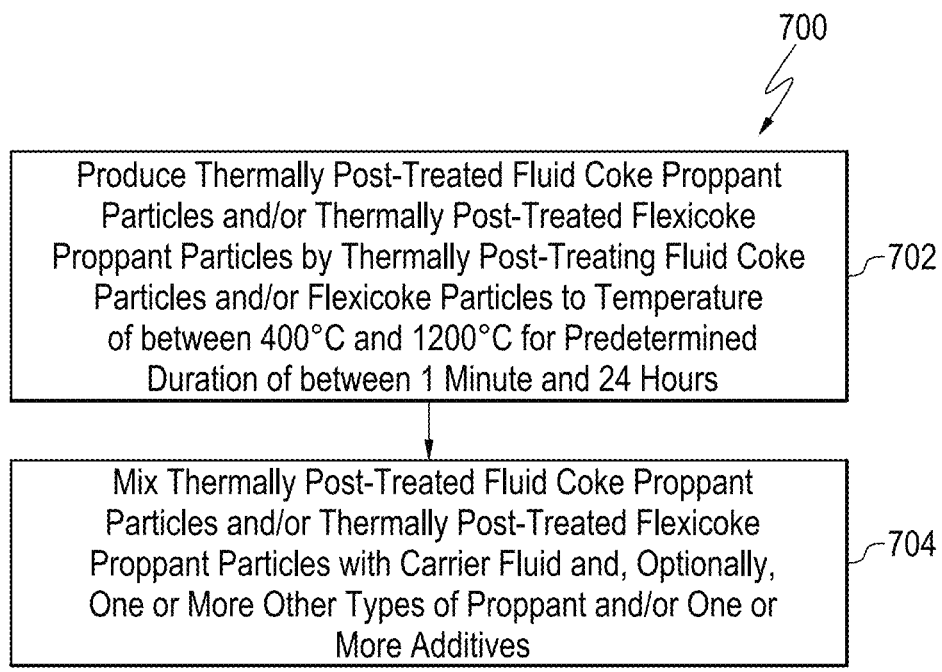
FIG. 7 is a process flow diagram of an exemplary method of making the fracturing fluid described herein.

FIG. 7 is a process flow diagram of an exemplary method 700 of making the fracturing fluid described herein. The method 700 begins at block 702, at which thermally post-treated fluid coke and/or flexicoke proppant particles are produced by thermally post-treating fluid coke and/or flexicoke particles, respectively, to a temperature in a range from 400° C. to 1200° C. (e.g., around 400° C. to around 500° C., around 500° C. to around 600° C., around 600° C. to around 700° C., around 700° C. to around 800° C., around 800° C. to around 900° C., around 900° C. to around 1000° C., around 1000° C. to around 1100° C. and around 1100° C. to around 1200° C., to name a few non-limiting examples) for a predetermined duration that is in a range from 1 minute to 24 hours (e.g., a duration from around 1 minute to around 24 hours (around 1 minute to around 1 hour, around 1 hour to around 2 hours, around 2 hours to around 4 hours, around 4 hours to around 6 hours, around 4 hours to around 8 hours, around 8 hours to around 10 hours, around 8 hours to around 12 hours, around 12 hours to around 14 hours, around 12 hours to around 16 hours, around 16 hours to around 18 hours, around 16 hours to around 20 hours, around 20 hours to around 22 hours, and around 20 hours to around 24 hours, to name a few non-limiting examples). At block 704, the fracturing fluid is then made by mixing the thermally post-treated fluid coke and/or flexicoke proppant particles with a carrier fluid.

Those skilled in the art will appreciate that the exemplary methods 600 and 700 of FIGS. 6 and 7, respectively, are susceptible to modification without altering the technical effect provided by the present disclosure. In practice, the exact manner in which the method 600 and/or 700 is implemented will depend, at least in part, on the details of the specific implementation.

In various embodiments, the thermally post-treated fluid coke and/or flexicoke proppant particles have an average particle size distribution in a range from 5 µm to 500 µm (e.g., around 5, 10, 20, 30, 40, 50, 60, 70, 80, 90, 100, 125, 150, 175, 200, 225, 250, 275, 300, 325, 350, 375, 400, 425, 450, 475 or 500 µm). In various embodiments, the thermally post-treated fluid coke and/or flexicoke proppant particles may have an particle sizes ranging from 0.001, 0.01, 0.1, 1, µm, to 5, 10, 50, 100, 200, 400, 500, µm, to 600, 800, 1000 µm. In various embodiments, the thermally post-treated fluid coke and/or flexicoke proppant particles have an apparent density in a range from 1.0 g/cm³ to 2.2 g/cm³ (e.g., from around 1.0, 1.1, 1.2, 1.3, 1.4, 1.5, 1.6 g/cm³ to around 1.7, 1.8, 1.9, 2.0, 2.1, 2.2 g/cm³). In various embodiments, the thermally post-treated fluid coke and/or flexicoke proppant particles have a crush strength in a range from 3,000 psi to 15,000 psi (e.g., around 3,000, 4,000, 5,000, 6,000, 7,000, 8,000, 9,000, 10,000, 11,000, 12,000, 13,000, 14,000 or 15,000 psi). In various embodiments, the thermally post-treated fluid coke and/or flexicoke proppant particles have a nanoindentation modulus in a range from 5 GPa to 50 GPa (e.g., around 5, 10, 15, 20, 25, 30, 35, 40, 45 or 50 GPa). In various embodiments, the thermally post-treated fluid coke and/or flexicoke proppant particles have a local hardness value in a range from 1 GPa to 5 GPa (e.g., around 1.0, 1.5, 2.0, 2.5, 3.0, 3.5, 4.0, 4.5 or 5.0 GPa).

In various embodiments, the thermally post-treated fluid coke and/or flexicoke proppant particles have a carbon content in a range from 60 wt % to 99.5 wt % (e.g., around 60, 65, 70, 75, 80, 85, 90, 95, 96, 97, 98, 99, 99.5 wt %). In various embodiments, the thermally post-treated fluid coke and/or flexicoke proppant particles have a C/H ratio in a range from 25:1 to 100:1 (e.g., around 25:1, 30:1, 35:1, 40:1, 45:1, 50:1, 55:1, 60:1, 65:1, 70:1, 75:1, 80:1, 85:1, 90:1, 95:1 or 100:1). In various embodiments, the thermally post-treated fluid coke and/or flexicoke proppant particles have a percent degradables in a range from 0% to 3%. In various embodiments, the thermally post-treated fluid coke and/or flexicoke proppant particles have an impurities content in a range from 1 wt % to 25 wt % (e.g., around 1, 2, 3, 4, 5, 10, 15, 20 or 25 wt %). In various embodiments, the thermally post-treated fluid coke and/or flexicoke proppant particles have a sulfur content in a range from 0 wt % to 10 wt % (e.g., around 0, 1, 2, 3, 4, 5, 6, 7, 8, 9, 10 wt %). In various embodiments, the thermally post-treated fluid coke and/or flexicoke proppant particles have a nitrogen content in a range from 0 wt % to 3 wt % (e.g., around 0.0, 0.5, 1.0, 1.5, 2.0, 2.5 or 3.0 wt %).

In some embodiments in which fluid coke particles are utilized, at least a portion of such fluid coke particles include fluid coke fines. In such embodiments, the method 600 and/or 700 may further include producing the fluid coke fines by grinding and/or sieving bulk fluid coke particles to a particle size of at most 105 µm. In some embodiments in which flexicoke particles are utilized, at least a portion of such flexicoke particles include flexicoke fines. In such embodiments, the method 600 and/or 700 may further include producing the flexicoke fines by grinding and/or sieving bulk flexicoke particles to a particle size of at most 105 µm. In some embodiments in which flexicoke particles are utilized, at least a portion of such flexicoke particles include wet flexicoke fines and/or dry flexicoke fines. In such embodiments, the method 600 and/or 700 may further include producing the wet flexicoke fines and/or the dry flexicoke fines via a FLEXICOKING™ process.

In various embodiments, the fracturing fluid further includes second proppant particles. In such embodiments, the second proppant particles may include sand, LWP, and/or ULWP. Additionally or alternatively, in such embodiments, the second proppant particles may include fluid coke particles, flexicoke particles, delayed coke particles, thermally post-treated delayed coke particles, pyrolysis coke particles, coal-derived coke particles (e.g., blast furnace coke particles and/or metallurgical coke particles), and/or microproppant coke particles. Furthermore, in such embodiments, the method 700 may further include mixing the thermally post-treated fluid coke and/or flexicoke proppant particles with the second proppant particles in addition to the carrier fluid.

In some embodiments, the carrier fluid is an aqueous carrier fluid including water. In other embodiments, the carrier fluid is a nonaqueous carrier fluid that is substantially free of water. Moreover, in some embodiments, the fracturing fluid further includes one or more acids, one or more biocides, one or more breakers, one or more corrosion inhibitors, one or more crosslinkers, one or more friction reducers (e.g., polyacrylamides), one or more high-viscosity friction reducers, one or more gels, one or more crosslinked gels, one or more oxygen scavengers, one or more pH control additives, one or more scale inhibitors, one or more surfactants, one or more weighting agents, one or more inert solids, one or more fluid loss control agents, one or more emulsifiers, one or more emulsion thinners, one or more emulsion thickeners, one or more viscosifying agents, one or more foaming agents, one or more stabilizers, one or more chelating agents, one or more mutual solvents, one or more oxidizers, one or more reducers, one or more clay stabilizing agents, or any combination thereof. In such embodiments, the method 700 may further include mixing the thermally post-treated fluid coke and/or flexicoke proppant particles with the additive(s) in addition to the carrier fluid.

This disclosure can include one or more of the following non-limiting aspects and/or embodiments:

A1. A fracturing fluid, comprising: a carrier fluid; and at least one of thermally post-treated fluid coke particles and thermally post-treated flexicoke proppant particles, comprising at least one of fluid coke particles and flexicoke particles, respectively, that have been thermally post-treated to a temperature in a range from 400° C. to 1200° C. for a predetermined duration.

A2. The fracturing fluid of A1, wherein the predetermined duration is in a range from 1 minute to 24 hours.

A3. The fracturing fluid of A1 or A2, wherein the at least one of the thermally post-treated fluid coke proppant particles and the thermally post-treated flexicoke proppant particles have an average particle size distribution in a range from 5 μm to 500 μm.

A4. The fracturing fluid of any of A1 to A3, wherein the at least one of the thermally post-treated fluid coke proppant particles and the thermally post-treated flexicoke proppant particles have an apparent density in a range from 1.0 g/cm³ to 2.2 g/cm³.

A5. The fracturing fluid of any of A1 to A4, wherein the at least one of the thermally post-treated fluid coke proppant particles and the thermally post-treated flexicoke proppant particles have a crush strength in a range from 3,000 psi to 15,000 psi.

A6. The fracturing fluid of any of A1 to A5, wherein the at least one of the thermally post-treated fluid coke proppant particles and the thermally post-treated flexicoke proppant particles have a nanoindentation modulus in a range from 5 GPa to 50 GPa.

A7. The fracturing fluid of any of A1 to A6, wherein the at least one of the thermally post-treated fluid coke proppant particles and the thermally post-treated flexicoke proppant particles have a local hardness value as measured through nanoindentation in a range from 1 GPa to 5 GPa.

A8. The fracturing fluid of any of A1 to A7, wherein the at least one of the thermally post-treated fluid coke proppant particles and the thermally post-treated flexicoke proppant particles have a carbon content in a range from 60 wt % to 99.5 wt %.

A9. The fracturing fluid of any of A1 to A8, wherein the at least one of the thermally post-treated fluid coke proppant particles and the thermally post-treated flexicoke proppant particles have a C/H ratio in a range from 25:1 to 100:1.

A10. The fracturing fluid of any of A1 to A9, wherein the at least one of the thermally post-treated fluid coke proppant particles and the thermally post-treated flexicoke proppant particles have a percent degradables in a range from 0% to 3%.

A11. The fracturing fluid of any of A1 to A10, wherein the at least one of the thermally post-treated fluid coke proppant particles and the thermally post-treated flexicoke proppant particles have an impurities content in a range from 1 wt % to 25 wt %.

A12. The fracturing fluid of any of A1 to A11, wherein the at least one of the thermally post-treated fluid coke proppant particles and the thermally post-treated flexicoke proppant particles have a sulfur content in a range from 0 wt % to 10 wt %.

A13. The fracturing fluid of any of A1 to A12, wherein the at least one of the thermally post-treated fluid coke proppant particles and the thermally post-treated flexicoke proppant particles have a nitrogen content in a range from 0 wt % to 3 wt %.

A14. The fracturing fluid of any of A1 to A13, wherein at least a portion of the fluid coke particles comprises fluid coke fines that are produced by grinding or sieving bulk fluid coke particles to a particle size of at most 105 μm.

A15. The fracturing fluid of any of A1 to A14, wherein at least a portion of the flexicoke particles comprises flexicoke fines produced by grinding or sieving bulk flexicoke particles to a particle size of at most 105 μm.

A16. The fracturing fluid of any of A1 to A15, wherein at least a portion of the flexicoke particles comprise at least one of wet flexicoke fines and dry flexicoke fines produced via a FLEXICOKING™ process.

A17. The fracturing fluid of any of A1 to A16, further comprising second proppant particles.

A18. The fracturing fluid of A17, wherein the second proppant particles comprise at least one of sand, LWP, and ULWP.

A19. The fracturing fluid of A17, wherein the second proppant particles comprise at least one of fluid coke particles, flexicoke particles, delayed coke particles, thermally post-treated delayed coke particles, pyrolysis coke particles, coal-derived coke particles, and microproppant coke particles.

A20. The fracturing fluid of any of A1 to A19, wherein the carrier fluid comprises water.

A21. The fracturing fluid of any of A1 to A19, wherein the carrier fluid is substantially free of water.

A22. The fracturing fluid of any of A1 to A21, further comprising at least one of an acid, a biocide, a breaker, a corrosion inhibitor, a crosslinker, a friction reducer, a gel, an oxygen scavenger, a pH control additive, a scale inhibitor, a surfactant, a weighting agent, an inert solid, a fluid loss control agent, an emulsifier, an emulsion thinner, an emulsion thickener, a viscosifying agent, a foaming agent, a stabilizer, a chelating agent, a mutual solvent, an oxidizer, a reducer, and a clay stabilizing agent.

B1. A method, comprising: introducing a fracturing fluid into a subterranean formation, the fracturing fluid comprising a carrier fluid and at least one of thermally post-treated fluid coke proppant particles and thermally post-treated flexicoke proppant particles; wherein the at least one of the thermally post-treated fluid coke proppant particles and the thermally post-treated flexicoke proppant particles comprises at least one of fluid coke particles and flexicoke particles, respectively, that have been thermally post-treated to a temperature in a range from 400° C. to 1200° C. for a predetermined duration.

B2. The method of B1, wherein the predetermined duration is in a range from 1 minute to 24 hours.

B3. The method of B1 or B2, further comprising depositing at least a portion of the at least one of the thermally post-treated fluid coke proppant particles and the thermally post-treated flexicoke proppant particles within hydraulic fractures in the subterranean formation to form a proppant pack.

B4. The method of any of B1 to B3, wherein the at least one of the thermally post-treated fluid coke proppant particles and the thermally post-treated flexicoke proppant particles have an average particle size distribution in a range from 5 μm to 500 μm.

B5. The method of any of B1 to B4, wherein the at least one of the thermally post-treated fluid coke proppant particles and the thermally post-treated flexicoke proppant particles have an apparent density in a range from 1.0 g/cm$^3$ to 2.2 g/cm$^3$.

B6. The method of any of B1 to B5, wherein the at least one of the thermally post-treated fluid coke proppant particles and the thermally post-treated flexicoke proppant particles have a crush strength in a range from 3,000 psi to 15,000 psi.

B7. The method of any of B1 to B6, wherein the at least one of the thermally post-treated fluid coke proppant particles and the thermally post-treated flexicoke proppant particles have a nanoindentation modulus in a range from 5 GPa to 50 GPa.

B8. The method of any of B1 to B7, wherein the at least one of the thermally post-treated fluid coke proppant particles and the thermally post-treated flexicoke proppant particles have a local hardness value in a range from 1 GPa to 5 GPa.

B9. The method of any of B1 to B8, wherein the at least one of the thermally post-treated fluid coke proppant particles and the thermally post-treated flexicoke proppant particles have a carbon content in a range from 60 wt % to 99.5 wt %.

B10. The method of any of B1 to B9, wherein the at least one of the thermally post-treated fluid coke proppant particles and the thermally post-treated flexicoke proppant particles have a C/H ratio in a range from 25:1 to 100:1.

B11. The method of any of B1 to B10, wherein the at least one of the thermally post-treated fluid coke proppant particles and the thermally post-treated flexicoke proppant particles have a percent degradables in a range from 0% to 3%.

B12. The method of any of B1 to B11, wherein the at least one of the thermally post-treated fluid coke proppant particles and the thermally post-treated flexicoke proppant particles have an impurities content in a range from 1 wt % to 25 wt %.

B13. The method of any of B1 to B12, wherein the at least one of the thermally post-treated fluid coke proppant particles and the thermally post-treated flexicoke proppant particles have a sulfur content in a range from 0 wt % to 10 wt %.

B14. The method of any of B1 to B13, wherein the at least one of the thermally post-treated fluid coke proppant particles and the thermally post-treated flexicoke proppant particles have a nitrogen content in a range from 0 wt % to 3 wt %.

B15. The method of any of B1 to B14, wherein at least a portion of the fluid coke particles comprises fluid coke fines.

B16. The method of B15, comprising producing the fluid coke fines by grinding or sieving bulk fluid coke particles to a particle size of at most 105 μm.

B17. The method of any of B1 to B16, wherein at least a portion of the flexicoke particles comprises flexicoke fines.

B18. The method of B17, comprising producing the flexicoke fines by grinding or sieving bulk flexicoke particles to a particle size of at most 105 μm.

B19. The method of B17, wherein at least a portion of the flexicoke fines comprises at least one of wet flexicoke fines and dry flexicoke fines, and wherein the method comprises producing the at least one of the wet flexicoke fines and the dry flexicoke fines via a FLEXICOKING™ process.

B20. The method of any of B1 to B19, wherein the fracturing fluid further comprises second proppant particles.

B21. The method of B20, wherein the second proppant particles comprise at least one of sand, LWP, and ULWP.

B22. The method of B20, wherein the second proppant particles comprise at least one of fluid coke particles, flexicoke particles, delayed coke particles, thermally post-treated delayed coke particles, pyrolysis coke particles, coal-derived coke particles, and microproppant coke particles.

B23. The method of any of B1 to B22, wherein the carrier fluid comprises water.

B24. The method of any of B1 to B22, wherein the carrier fluid is substantially free of water.

B25. The method of any of B1 to B24, wherein the fracturing fluid further comprises at least one of an acid, a biocide, a breaker, a corrosion inhibitor, a crosslinker, a friction reducer, a gel, an oxygen scavenger, a pH control additive, a scale inhibitor, a surfactant, a weighting agent, an inert solid, a fluid loss control agent, an emulsifier, an emulsion thinner, an emulsion thickener, a viscosifying agent, a foaming agent, a stabilizer, a chelating agent, a mutual solvent, an oxidizer, a reducer, and a clay stabilizing agent.

C1. A method of making a fracturing fluid, comprising: producing at least one of thermally post-treated fluid coke proppant particles and thermally post-treated flexicoke proppant particles by thermally post-treating at least one of fluid coke particles and flexicoke particles, respectively, to a temperature in a range from 400° C. to 1200° C. for a predetermined duration that is in range from 1 minute to 24 hours; and mixing the at least one of the thermally post-treated fluid coke proppant particles and the thermally post-treated flexicoke proppant particles with at least a carrier fluid.

C2. The method of C1, wherein the at least one of the thermally post-treated fluid coke proppant particles and the thermally post-treated flexicoke proppant particles have an average particle size distribution in a range from 5 μm to 500 μm.

C3. The method of C1 or C2, wherein the at least one of the thermally post-treated fluid coke proppant particles and the thermally post-treated flexicoke proppant particles have an apparent density in a range from 1.0 g/cm$^3$ to 2.2 g/cm$^3$.

C4. The method of any of C1 to C3, wherein the at least one of the thermally post-treated fluid coke proppant particles and the thermally post-treated flexicoke proppant particles have a crush strength in a range from 3,000 psi to 15,000 psi.

C5. The method of any of C1 to C4, wherein the at least one of the thermally post-treated fluid coke proppant particles and the thermally post-treated flexicoke proppant particles have a nanoindentation modulus in a range from 5 GPa to 50 GPa.

C6. The method of any of C1 to C5, wherein the at least one of the thermally post-treated fluid coke proppant particles and the thermally post-treated flexicoke proppant particles have a local hardness value in a range from 1 GPa to 5 GPa.

C7. The method of any of C1 to C6, wherein the at least one of the thermally post-treated fluid coke proppant particles and the thermally post-treated flexicoke proppant particles have a carbon content in a range from 60 wt % to 99.5 wt %.

C8. The method of any of C1 to C7, wherein the at least one of the thermally post-treated fluid coke proppant particles and the thermally post-treated flexicoke proppant particles have a C/H ratio in a range from 25:1 to 100:1.

C9. The method of any of C1 to C8, wherein the at least one of the thermally post-treated fluid coke proppant particles and the thermally post-treated flexicoke proppant particles have a percent degradables in a range from 0% to 3%.

C10. The method of any of C1 to C9, wherein the at least one of the thermally post-treated fluid coke proppant particles and the thermally post-treated flexicoke proppant particles have an impurities content in a range from 1 wt % to 25 wt %.

C11. The method of any of C1 to C10, wherein the at least one of the thermally post-treated fluid coke proppant particles and the thermally post-treated flexicoke proppant particles have a sulfur content in a range from 0 wt % to 10 wt %.

C12. The method of any of C1 to C11, wherein the at least one of the thermally post-treated fluid coke proppant particles and the thermally post-treated flexicoke proppant particles have a nitrogen content in a range from 0 wt % to 3 wt %.

C13. The method of any of C1 to C12, wherein at least a portion of the fluid coke particles comprises fluid coke fines.

C14. The method of C13, comprising producing the fluid coke fines by grinding or sieving bulk fluid coke particles to a particle size of at most 105 μm.

C15. The method of any of C1 to C14, wherein at least a portion of the flexicoke particles comprises flexicoke fines.

C16. The method of C15, comprising producing the flexicoke fines by grinding or sieving bulk flexicoke particles to a particle size of at most 105 μm.

C17. The method of C15, wherein at least a portion of the flexicoke fines comprise at least one of wet flexicoke fines and dry flexicoke fines, and wherein the method comprises producing the at least one of the wet flexicoke fines and the dry flexicoke fines via a FLEXICOKING™ process.

C18. The method of any of C1 to C17, further comprising mixing the at least one of thermally post-treated fluid coke proppant particles and the thermally post-treated flexicoke proppant particles with at least one type of second proppant particles in addition to the carrier fluid.

C19. The method of C18, wherein the at least one type of second proppant particles comprises at least one of sand proppant particles, a LWP particles, and ULWP particles.

C20. The method of C18, wherein the at least one type of second proppant particles comprises at least one of fluid coke particles, flexicoke particles, delayed coke particles, thermally post-treated delayed coke particles, pyrolysis coke particles, coal-derived coke particles, and microproppant coke particles.

C21. The method of any of C1 to C20, further comprising mixing the at least one of thermally post-treated fluid coke proppant particles and the thermally post-treated flexicoke proppant particles with at least one additive in addition to the carrier fluid, wherein the at least one additive comprises at least one of an acid, a biocide, a breaker, a corrosion inhibitor, a crosslinker, a friction reducer, a gel, an oxygen scavenger, a pH control additive, a scale inhibitor, a surfactant, a weighting agent, an inert solid, a fluid loss control agent, an emulsifier, an emulsion thinner, an emulsion thickener, a viscosifying agent, a foaming agent, a stabilizer, a chelating agent, a mutual solvent, an oxidizer, a reducer, and a clay stabilizing agent.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present disclosure may be modified and practiced in different but equivalent manners apparent to those skilled in the art having the benefit of the teachings herein. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present disclosure includes all alternatives, modifications, and equivalents falling within the true spirit and scope of the appended claims.

What is claimed is:

1. A fracturing fluid, comprising:
a carrier fluid; and
first proppant particles selected from thermally post-treated fluid coke proppant particles, thermally post-treated flexicoke proppant particles, and mixtures thereof, wherein the first proppant particles have been thermally post-treated at a temperature in a range from 400 degrees Celsius (° C.) to 1200° C. for a predetermined duration.

2. The fracturing fluid of claim 1, wherein the predetermined duration ranges from 1 minute to 24 hours.

3. The fracturing fluid of claim 1, wherein the first proppant particles have particle sizes in a range from 5 microns (μm) to 500 μm.

4. The fracturing fluid of claim 1, wherein the first proppant particles have an apparent density in a range from 1.0 gram per cubic centimeter (g/cm$^3$) to 2.2 g/cm$^3$.

5. The fracturing fluid of claim 1, wherein the first proppant particles have a crush strength in a range from 3,000 pounds per square inch (psi) to 15,000 psi.

6. The fracturing fluid of claim 1, wherein the first proppant particles have a nanoindentation modulus in a range from 5 gigapascals (GPa) to 50 GPa.

7. The fracturing fluid of claim 1, wherein the first proppant particles have a local hardness value as measured through nanoindentation in a range from 1 gigapascal (GPa) to 5 GPa.

8. The fracturing fluid of claim 1, wherein the first proppant particles have a carbon content in a range from 60 weight percent (wt %) to 99.5 wt % and a carbon-to-hydrogen (C/H) molar ratio in a range from 25:1 to 100:1.

9. The fracturing fluid of claim 1, wherein the first proppant particles comprise degradables at a concentration in a range from 0% to 3%, based on the total weight of the first proppant particles.

10. The fracturing fluid of claim 1, wherein the first proppant particles have an impurities content in a range from 1 wt% to 25 wt %, a sulfur content in a range from 0 wt % to 10 wt %, and a nitrogen content in a range from 0 wt % to 3 wt%, based on the total weight of the first proppant particles.

11. The fracturing fluid of claim 1, wherein the first proppant particles comprise particles having sizes no greater than 105 microns (µm) at a concentration of no more than 25 weight percent (wt %), based on the total weight of the first proppant particles.

12. The fracturing fluid of claim 1, wherein at least a portion of the flexicoke particles comprise at least one of thermally post-treated wet flexicoke fines and/or thermally post-treated dry flexicoke.

13. The fracturing fluid of claim 1, further comprising second proppant particles differing from the first proppant particles.

14. The fracturing fluid of claim 13, wherein the second proppant particles comprise at least one of:
sand;
fluid coke particles that have not been thermally post-treated;
flexicoke particles that have not been thermally post-treated;
delayed coke particles that have not been thermally post-treated;
thermally post-treated delayed coke particles;
pyrolysis coke particles; and
coal-derived coke particles.

15. The fracturing fluid of claim 1, wherein the carrier fluid comprises water.

16. The fracturing fluid of claim 1, wherein the carrier fluid is substantially free of water.

17. The fracturing fluid of claim 1, further comprising at least one of an acid, a biocide, a breaker, a corrosion inhibitor, a crosslinker, a friction reducer, a gel, an oxygen scavenger, a pH control additive, a scale inhibitor, a surfactant, a weighting agent, an inert solid, a fluid loss control agent, an emulsifier, an emulsion thinner, an emulsion thickener, a viscosifying agent, a foaming agent, a stabilizer, a chelating agent, a mutual solvent, an oxidizer, a reducer, and a clay stabilizing agent.

18. The fracturing fluid of claim 1, wherein the predetermined duration ranges from 15 minutes to 4 hours.

19. The fracturing fluid of claim 1, wherein the first proppant particles have been thermally post-treated at a temperature in a range from 600 degrees Celsius (°C.) to 1050°C. for the predetermined duration.

20. The fracturing fluid of claim 1, wherein the first proppant particles have been thermally post-treated at a temperature in a range from 800 degrees Celsius (°C.) to 1050°C. for the predetermined duration.

21. The fracturing fluid of claim 1, wherein the first proppant particles have particle sizes in a range from 50 microns (µm) to 400 um.

22. The fracturing fluid of claim 1, wherein the first proppant particles have an apparent density in a range from 1.2 g/cm$^3$ to 2.0 g/cm$^3$.

23. The fracturing fluid of claim 1, wherein the first proppant particles have a crush strength in a range from 5,000 pounds per square inch (psi) to 15,000 psi.

24. The fracturing fluid of claim 1, wherein the first proppant particles have a nanoindentation modulus in a range from 10 gigapascals (GPa) to 40 GPa.

25. The fracturing fluid of claim 1, wherein the first proppant particles have a carbon content in a range from 75 wt % to 95 wt %, based on the total weight of the first proppant particles, and a carbon-to-hydrogen (C/H) molar ratio in a range from 50:1 to 100:1.

26. The fracturing fluid of claim 1, wherein the first proppant particles are not coated.

27. The fracturing fluid of claim 1, wherein at least a portion of the first proppant particles are coated.

28. The fracturing fluid of claim 1, wherein the first proppants are prepared by a process comprising:
thermally post-treating fluid coke particles, flexicoke particles, and/or a mixture thereof at a temperature in a range from 400 degrees Celsius (°C.) to 1200°C. for the predetermined duration to obtain thermally post-treated coke particles;
grinding and/or sieving the thermally post-treated coke particles to obtain ground and/or sieved coke particles;
optionally coating the ground and/or sieved coke particles to obtain coated coke particles; and
obtaining the first proppants from the ground and/or sieved coke particles and/or the coated coke particles.

29. The fracturing fluid of claim 1, wherein the first proppants are prepared by a process comprising:
grinding and/or sieving fluid coke particles, flexicoke particles, and/or a mixture thereof to obtain ground and/or sieved coke particles;
thermally post-treating the ground and/or sieved coke particles at a temperature in a range from 400 degrees Celsius (°C.) to 1200°C. for the predetermined duration to obtain thermally post-treated coke particles;
optionally coating the thermally post-treated coke particles to obtain coated coke particles; and
obtaining the first proppants from the thermally post-treated coke particles and/or the coated coke particles.

30. A method, comprising:
introducing a fracturing fluid into a subterranean formation, the fracturing fluid comprising a carrier fluid and first proppant particles selected from thermally post-treated fluid coke proppant particles, thermally post-treated flexicoke proppant particles, and mixtures thereof;
wherein the first proppant particles have been thermally post-treated to a temperature in a range from 400 degrees Celsius (° C.) to 1200° C. for a predetermined duration.

31. The method of claim 19, wherein the predetermined duration ranges from 1 minute to 24 hours.

32. The method of claim 30, wherein the predetermined duration ranges from 15 minutes to 4 hours.

33. The method of claim 30, wherein the first proppant particles have been thermally post-treated at a temperature in a range from 600 degrees Celsius (C) to 1050°C. for the predetermined duration.

34. The method of claim 30, wherein the first proppant particles have been thermally post-treated at a temperature in a range from 800 degrees Celsius (°C.) to 1050°C. for the predetermined duration.

35. The method of claim 30, wherein the first proppant particles are not coated.

36. The method of claim 30, wherein at least a portion of the first proppant particles are coated.

37. A method of making a fracturing fluid, comprising:
(I) post-treating fluid coke particles, flexicoke particles, or a mixture thereof at a temperature in a range from 400 degrees Celsius (° C.) to 1200° C. for a predetermined duration that is in range from 1 minute to 24 hours to obtain thermally post-treated particles;
(II) obtaining first proppant particles from the post-treated particles; and
(III) combining the first proppant particles with at least a carrier fluid.

38. The method of claim 37, wherein at least a portion of the first proppant particles have sizes no greater than 105 microns (μm).

39. The method of claim 37, wherein the first proppant particles comprise flexicoke fine particles having sizes no greater than 105 microns (μm), and at least a portion of the flexicoke fine particles are obtained from wet flexicoke fines and/or dry flexicoke fines as produced from the flexicoke production process.

40. The method of claim 37, further comprising combining second proppant particles with the carrier fluid.

41. The method of claim 37, wherein at least a portion of the first proppants are not coated.

42. The method of claim 37, wherein step (II) comprises:
(II.1) grinding and/or sieving the thermally post-treated particles to obtain ground and/or sieved coke particles;
(II.2) optionally coating the ground and/or sieved coke particles to obtain coated coke particles; and
(II.3) obtaining the first proppant particles from the ground and/or sieved coke particles and/or the coated coke particles.

43. The method of claim 37, wherein:
in step (I), the fluid coke particles and/or the flexicoke particles and/or the mixture thereof are prepared by a processing comprising:
(Ia) grinding and/or sieving precursor fluid coke particles, precursor flexicoke particles, and/or a mixture thereof to obtain ground and/or sieved coke particles; and
(Ib) obtaining the fluid coke particles, the flexicoke particles, and/or the mixture thereof from the ground and/or sieved coke particles.

* * * * *